United States Patent
Fujita

(10) Patent No.: US 11,747,166 B2
(45) Date of Patent: Sep. 5, 2023

(54) DRIVING ENVIRONMENT INFORMATION GENERATION METHOD, DRIVING CONTROL METHOD, DRIVING ENVIRONMENT INFORMATION GENERATION DEVICE

(71) Applicants: Nissan Motor Co., Ltd., Yokohama (JP); Renault S.A.S., Boulogne-Billancourt (FR)

(72) Inventor: Susumu Fujita, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 248 days.

(21) Appl. No.: 17/258,331

(22) PCT Filed: Jul. 11, 2018

(86) PCT No.: PCT/IB2018/000813
§ 371 (c)(1),
(2) Date: Jan. 6, 2021

(87) PCT Pub. No.: WO2020/012207
PCT Pub. Date: Jan. 16, 2020

(65) Prior Publication Data
US 2021/0270634 A1    Sep. 2, 2021

(51) Int. Cl.
*G01C 21/00* (2006.01)
*B60W 40/06* (2012.01)
*G06V 20/56* (2022.01)

(52) U.S. Cl.
CPC ......... *G01C 21/3822* (2020.08); *B60W 40/06* (2013.01); *G01C 21/3885* (2020.08);
(Continued)

(58) Field of Classification Search
CPC ............. B60W 40/06; B60W 2556/10; B60W 2552/10; B60W 2556/50; G01C 21/30;
(Continued)

(56) References Cited

U.S. PATENT DOCUMENTS

| | | | | |
|---|---|---|---|---|
| 6,385,536 B2* | 5/2002 | Kimura | ................ | G01C 21/30 340/988 |
| 8,527,199 B1* | 9/2013 | Burnette | ................ | G01C 21/32 701/425 |

(Continued)

FOREIGN PATENT DOCUMENTS

| | | |
|---|---|---|
| WO | 2016/027394 A1 | 2/2016 |
| WO | 2017/056249 A1 | 4/2017 |

*Primary Examiner* — Jelani A Smith
*Assistant Examiner* — Alyssa N Rorie
(74) *Attorney, Agent, or Firm* — Young Basile Hanlon & MacFarlane, P.C.

(57) ABSTRACT

A processor operates to: acquire first information regarding a surrounding travel environment including a travel lane in which a subject vehicle travels, on the basis of detection information from an onboard sensor; refer to map information stored in a storage device to acquire second information regarding lanes of a road; determine whether or not a travel road to which the travel lane belongs is a predetermined specific road, on the basis of the first information; and when a determination is made that the travel road is the specific road, composite the first information and the second information to generate travel environment information.

20 Claims, 11 Drawing Sheets

(52) U.S. Cl.
CPC ....... *G06V 20/588* (2022.01); *B60W 2552/10* (2020.02); *B60W 2556/10* (2020.02)

(58) Field of Classification Search
CPC  G01C 21/32; G01C 21/3822; G01C 21/3885; G01C 21/3407; G01C 21/3602; G01C 21/26; G01C 21/36; G05D 1/0274; G06V 20/588; G06V 20/58; G06V 20/582; G08G 1/167; G08G 1/0962; G08G 1/09; G01S 13/931; G01S 17/02; G01S 17/10
See application file for complete search history.

(56) References Cited

U.S. PATENT DOCUMENTS

| | | | |
|---|---|---|---|
| 9,494,438 B1 * | 11/2016 | Ichinokawa | G01C 21/32 |
| 10,215,572 B2 * | 2/2019 | Urano | G01C 21/32 |
| 10,773,719 B2 * | 9/2020 | Heidenreich | G01C 21/30 |
| 10,990,103 B2 * | 4/2021 | Rottkamp | G08G 1/096741 |
| 2010/0241354 A1 * | 9/2010 | Stahlin | H04L 67/12 701/532 |
| 2014/0088862 A1 | 3/2014 | Simon | |
| 2014/0379164 A1 | 12/2014 | Joh et al. | |
| 2015/0260530 A1 * | 9/2015 | Stenborg | G01C 21/28 701/461 |
| 2016/0046290 A1 | 2/2016 | Aharony et al. | |
| 2016/0259814 A1 * | 9/2016 | Mizoguchi | G06F 16/29 |
| 2017/0242441 A1 | 8/2017 | Nakaya et al. | |
| 2017/0305420 A1 | 10/2017 | Desens et al. | |
| 2018/0112997 A1 | 4/2018 | Fasola et al. | |
| 2018/0209802 A1 * | 7/2018 | Jung | G01C 21/3658 |
| 2018/0273031 A1 | 9/2018 | Fujita et al. | |
| 2019/0035110 A1 * | 1/2019 | Shikimachi | G06T 7/74 |
| 2019/0113925 A1 * | 4/2019 | Sim | G05D 1/0214 |
| 2019/0138824 A1 * | 5/2019 | Schack | B60W 30/12 |
| 2019/0385444 A1 * | 12/2019 | Inoue | G05D 1/0276 |

* cited by examiner

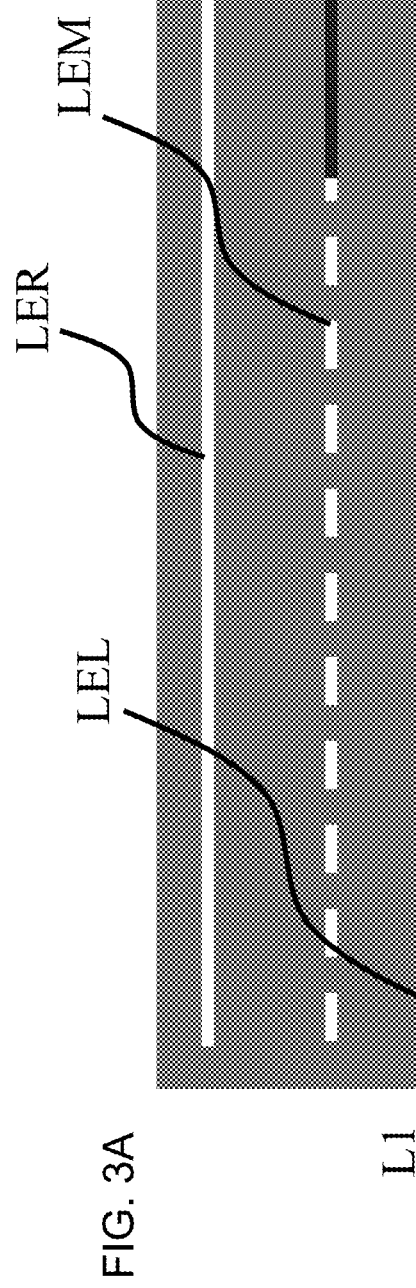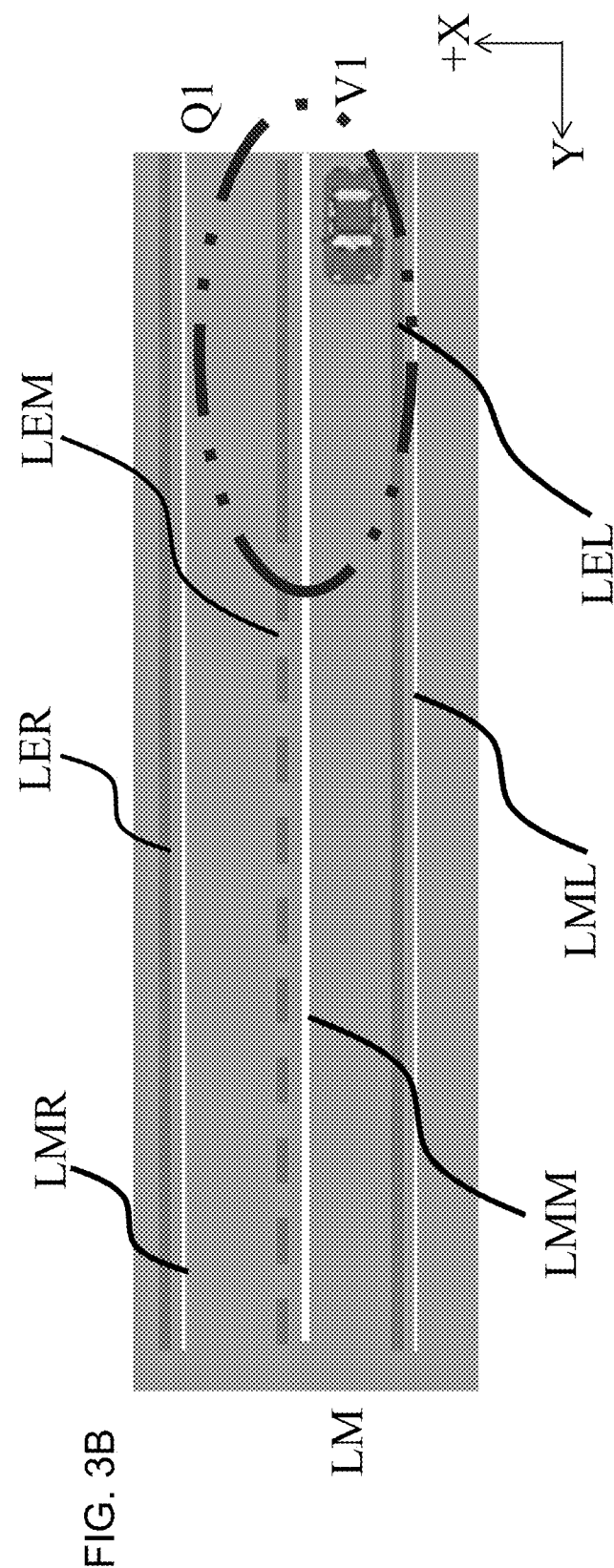

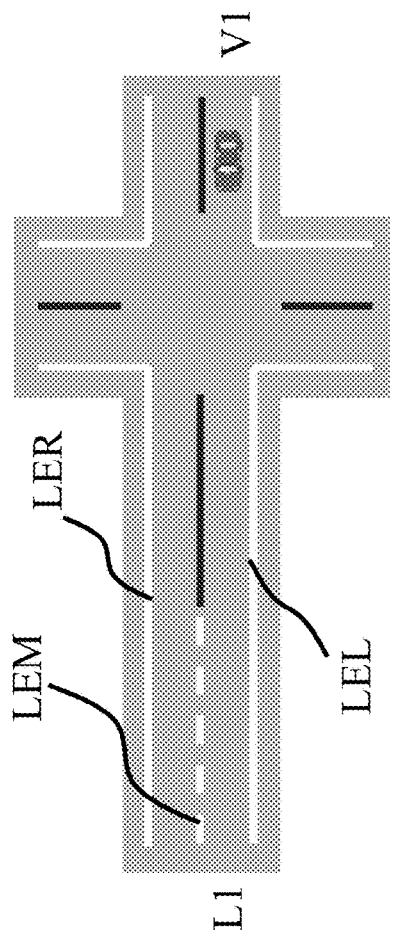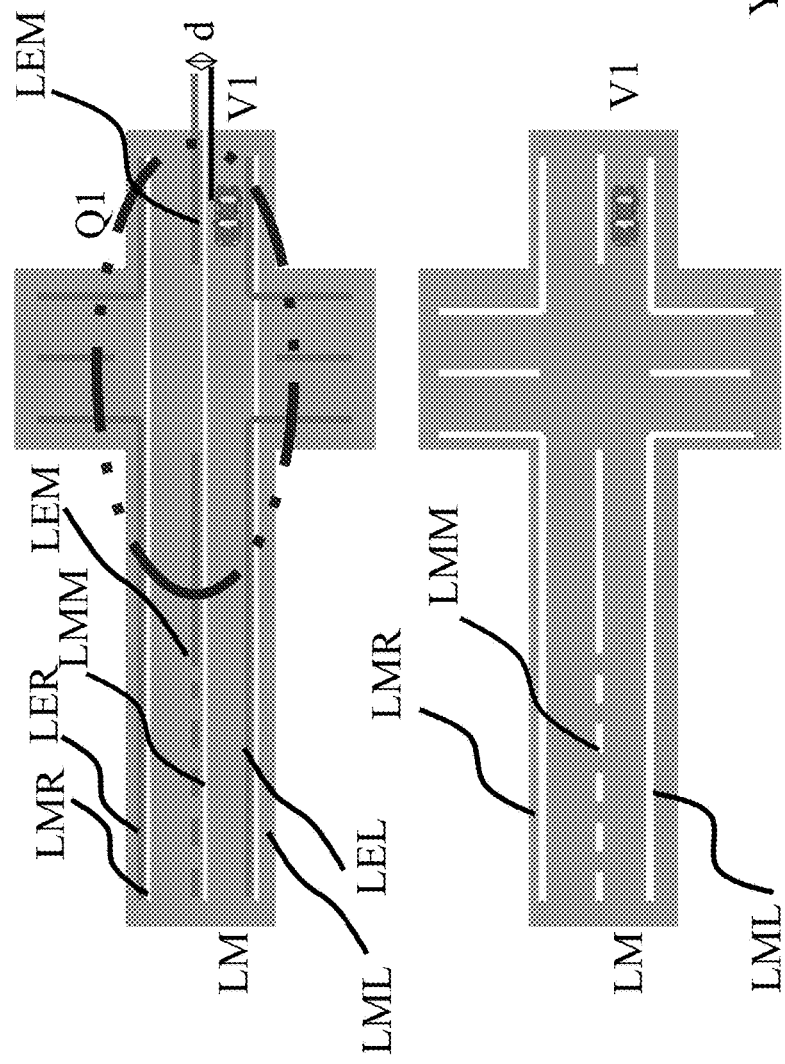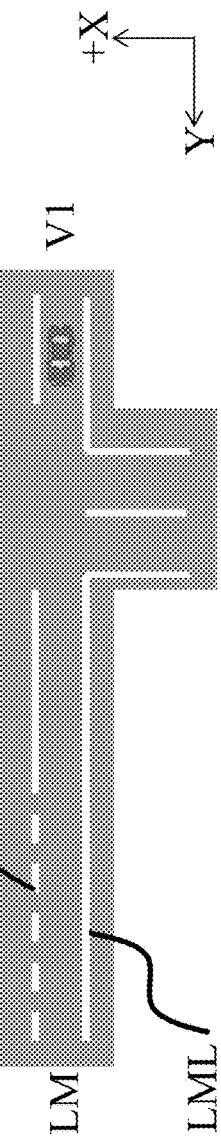
FIG. 4A
FIG. 4B
FIG. 4C

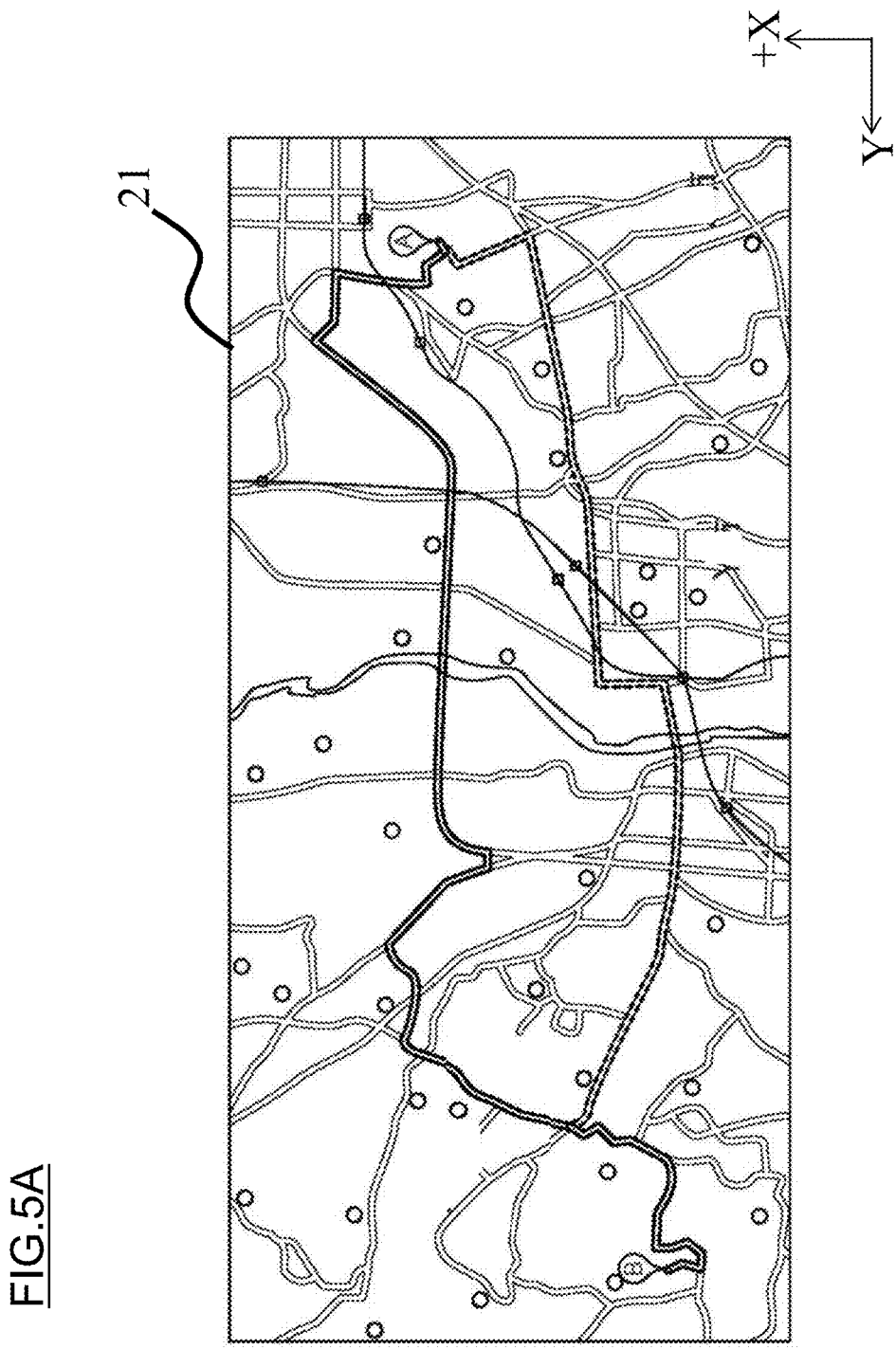

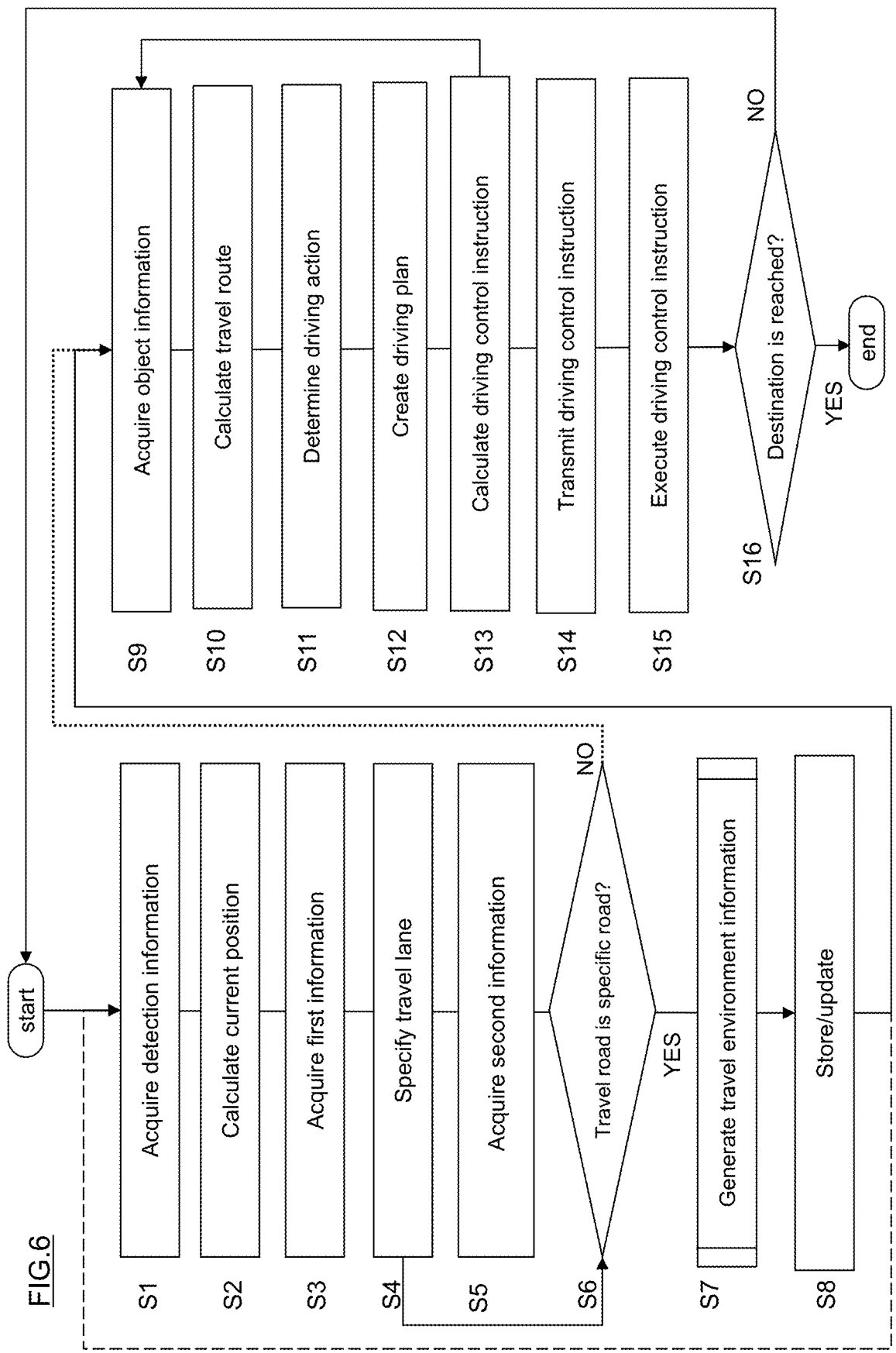

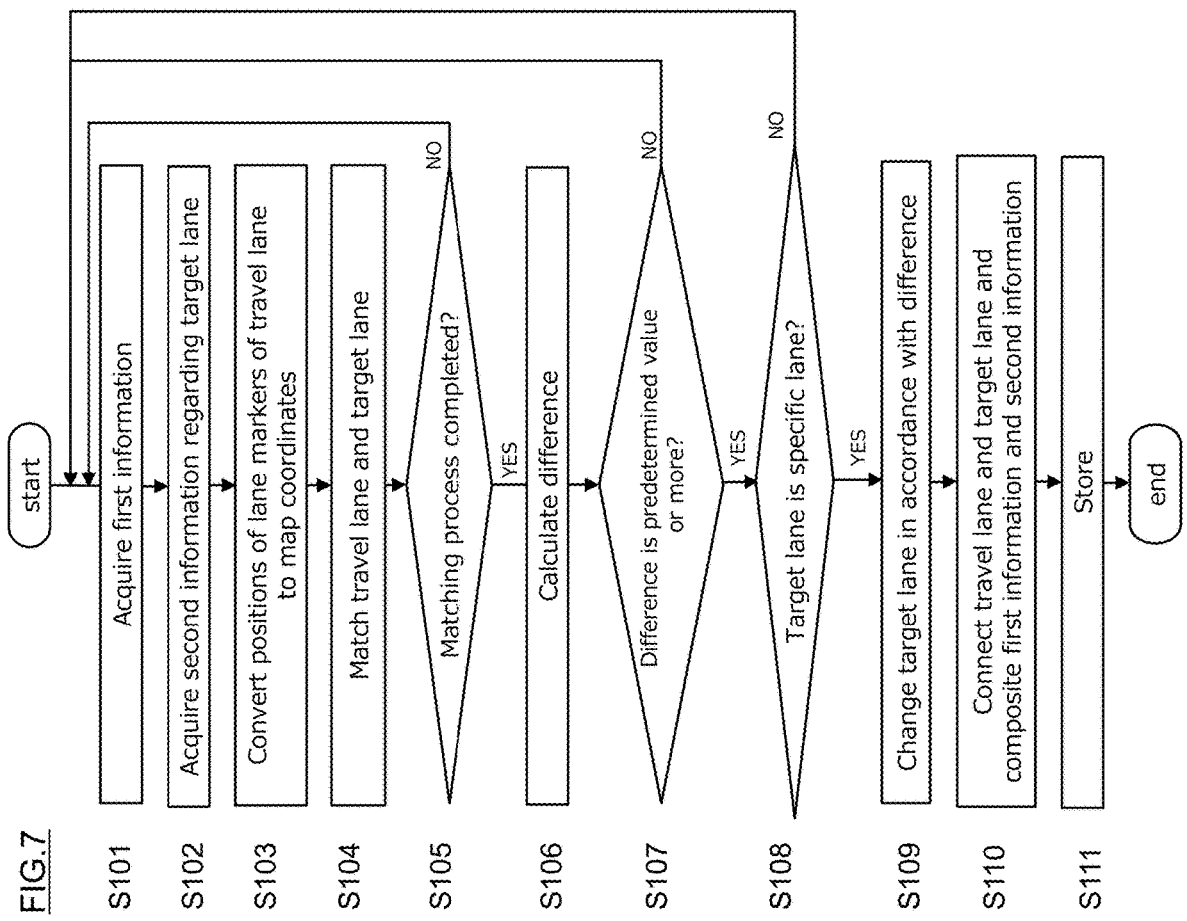

DRIVING ENVIRONMENT INFORMATION GENERATION METHOD, DRIVING CONTROL METHOD, DRIVING ENVIRONMENT INFORMATION GENERATION DEVICE

TECHNICAL FIELD

The present invention relates to a method of generating travel environment information that is referred to in driving control, a driving control method, and a travel environment information generation apparatus.

BACKGROUND

A technique is known, which includes extracting difference information between three-dimensional information detected around a vehicle by an onboard sensor and three-dimensional map information and correcting the three-dimensional information detected in the onboard sensor if a determination is made that the difference information is attributable to an intrinsic difference derived from the onboard sensor arrangement or the like, such as the mounting position of the onboard sensor (see WO2016/027394).

SUMMARY

In the above conventional technique, if the extracted difference information is information on a difference intrinsic to the vehicle, correction information intrinsic to the vehicle is generated for correcting the three-dimensional information around the vehicle, but nothing is studied for the timing of using detection information from an onboard sensor when correcting the map information.

A problem to be solved by the present invention is to appropriately control the timing of performing a process of generating travel environment information.

The present invention solves the above problem through acquiring first information based on detection information from an onboard sensor and second information regarding lanes of map information stored in a storage device, and when a determination is made that the travel road to which the travel lane of a subject vehicle belongs is a predetermined specific road, compositing the first information and the second information to generate travel environment information.

According to the present invention, the travel environment information is generated when the subject vehicle is traveling on the specific road and, therefore, the travel environment information in which the first information and the second information are appropriately composited can be generated.

BRIEF DESCRIPTION OF THE DRAWINGS

FIGS. 3A and 3B are a set of diagrams for describing a case in which misalignment occurs between a travel lane and a target lane;

FIGS. 4A-C is a set of diagrams for describing an example of a process of generating travel environment information;

FIG. 5A is a first diagram for describing a compositing process;

FIG. 6 is a flowchart illustrating a control procedure executed by the driving control system according to one or more embodiments of the present invention; and FIG. 7 is a flowchart illustrating a subroutine of step S7 of the control procedure illustrated in FIG. 6.

DETAILED DESCRIPTION

Hereinafter, one or more embodiments of the present invention will be described with reference to the drawings. In the embodiments, the present invention will be described by exemplifying a case in which the method of generating travel environment information and the travel environment information generation apparatus according to the present invention are applied to a driving control system.

Figure 1:
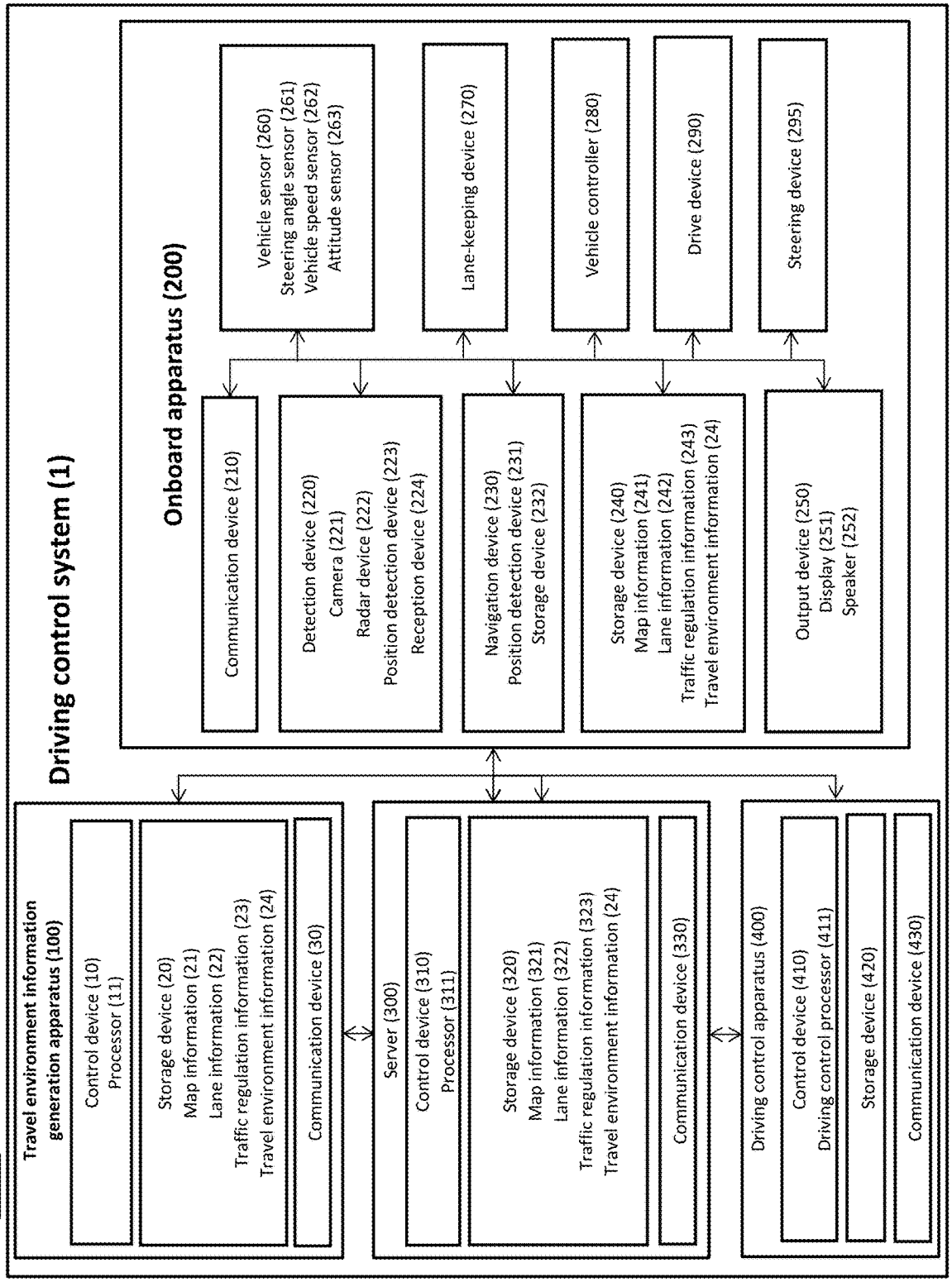
FIG. 1 is a block diagram of a driving control system according to one or more embodiments of the present invention.

FIG. 1 is a diagram illustrating the block configuration of a driving control system 1. The driving control system 1 according to one or more embodiments of the present invention includes a travel environment information generation apparatus 100, an onboard apparatus 200, and a driving control apparatus 400. The driving control system 1 may further include a server 300 with which the travel environment information generation apparatus 100 can exchange information via a communication device 30. The driving control system 1, the travel environment information generation apparatus 100, the onboard apparatus 200, the server 300, the driving control apparatus 400, and various modules provided therein may each be a computer that includes a computing device, such as one or more CPUs, and executes calculation processes.

The travel environment information generation apparatus 100 may be configured as hardware integrated with the driving control apparatus 400 and/or the onboard apparatus or may also be configured as distributed separate devices. One or more embodiments of the present invention will be described by exemplifying the driving control system which is configured such that the travel environment information generation apparatus 100 exchanges information with and cooperates with the onboard apparatus 200 equipped in a vehicle and the driving control apparatus 400 via the communication device 30.

The onboard apparatus 200 will be described.

The onboard apparatus 200 acquires detection information regarding a subject vehicle and the situation around the subject vehicle and outputs the acquired detection information to the outside. The onboard apparatus 200 controls the subject vehicle to travel autonomously, on the basis of a command from the driving control apparatus 400. The onboard apparatus 200 according to one or more embodiments of the present invention includes a communication device 210, a detection device 220, a navigation device 230, a storage device 240, an output device 250, a vehicle sensor 260, a lane-keeping device 270, a vehicle controller 280, a drive device 290, and a steering device 295.

The communication device 210 executes communication between the devices of the onboard apparatus 200 and communication with the external server 300. The devices which constitute the onboard apparatus 200 are connected to one another via a controller area network (CAN) or other onboard LAN (communication device 210) to mutually exchange information. The onboard apparatus 200 can exchange information with the travel environment information generation apparatus 100 and the driving control apparatus 400 via such an onboard LAN (communication device 210). The onboard apparatus 200 exchanges information with the external server 300 via the communication device 210 which performs wireless communication.

The detection device 220 acquires detection information around the subject vehicle which travels along a route. The detection device 220 of the vehicle recognizes the existence, position, and area of a travel lane in which the vehicle moves, and detects the existence, existing positions, and existing areas of objects including obstacles that exist around the travel lane. Although not particularly limited, the detection device 220 includes a camera 221. The camera 221 is, for example, an imaging device including an imaging element such as a CCD. The camera 221 may also be an infrared camera or a stereo camera. The camera 221 is disposed at a certain position of the vehicle and captures images of lane markers of a travel lane for the vehicle and objects around the vehicle. The term "around the vehicle" as used herein encompasses the concepts of "ahead of the vehicle," "behind the vehicle," "sideways ahead of the vehicle," and "sideways behind the vehicle." Objects include two-dimensional signs such as lane markers and stop lines painted on the road surface. Objects include three-dimensional physical objects. Objects include stationary objects such as traffic signs. Objects include moving objects such as pedestrians, two-wheel vehicles, and four-wheel vehicles (other vehicles). Objects include road structures that include traffic strips such as guardrails and curbstones, traffic signals, signs, and display devices.

The detection device 220 analyzes the image data and, on the basis of the analysis results, recognizes the existence, positions, and areas of the travel lane in which the subject vehicle travels and lanes in the vicinity thereof. The detection device 220 recognizes the presence or absence, positions, and types of lane markers of the travel lane. The detection device 220 recognizes the existence, positions, occupied areas, and types of objects.

The detection device 220 includes a radar device 222. Examples of the radar device 222 for use include those, such as millimeter-wave radar, laser radar, ultrasonic radar, and a laser rangefinder, which are of schemes known at the time of filing of the present application. The detection device 220 detects the presence or absence of objects, positions of the objects, and distances to the objects on the basis of the received signals from the radar device 222. The detection device 220 detects the presence or absence of objects, positions of the objects, and distances to the objects on the basis of the clustering results of point cloud information which the radar device acquires.

The detection device 220 may acquire the detection information of the travel route from external devices via the communication device 210. For example, when the server 300 collects the detection information, which is acquired from detection devices 220 of a plurality of other vehicle, via the communication device 330 and accumulates the collected detection information, each detection device 220 may acquire the detection information of another vehicle and/or the determination information based on the detection information from the server 300. When the server 300 manages the detection information from other vehicles as so-called probe information, the travel environment information generation apparatus 100 can use the information.

On the basis of the detection information from other vehicles that have previously traveled in the travel lane, the travel environment information generation apparatus 100 can generate travel environment information 24 and determine the accuracy of the detection information from the subject vehicle.

Additionally or alternatively, when the communication device 210 is capable of vehicle-to-vehicle communication between other vehicles and the subject vehicle, the detection device 220 may acquire the detection information from other vehicles. Of course, the detection device 220 can also acquire information on the travel lane or a road including the travel lane as the detection information from an external device of the Intelligent Transport System (ITS) via the communication device 210. The detection device 220 may acquire information in the vicinity of the vehicle by the onboard detection device 220 and may acquire information on an area far from the vehicle by a predetermined distance or more from an external device provided on a road side via the communication device 210.

The detection device 220 may include a position detection device 223. In one or more embodiments of the present invention, the detection results from a position detection device 231 of the navigation device 230 are acquired.

The detection device 220 sequentially outputs the detection results to the processor 11.

The navigation device 230 calculates the route from the current position of the vehicle to a destination using a scheme known at the time of filing of the present application. The calculated route is transmitted to the driving control apparatus 400 and/or the vehicle controller 280 for the use in the driving control for the vehicle. The calculated route is output as route guidance information via the output device 250, which will be described later. The navigation device 230 includes a position detection device 231. The position detection device 231 includes a receiver of the Global Positioning System (GPS) and detects a traveling position (latitude/longitude/map coordinate values) of the vehicle which is traveling. The current positional information is transmitted to the processor 11 as the detection information. Additionally or alternatively to the received signals from positioning satellites, odometry information or information from an orientation sensor or the vehicle sensor 260 may be used for calculation of the positional information.

The navigation device 230 accesses the storage device 240 and refers to map information 241, lane information 242, and traffic regulation information 243. The navigation device 230 specifies the travel lane in which the vehicle travels, on the basis of the current position of the vehicle detected by the position detection device 231. The travel lane may be a part of the route to a destination that is designated by the user or may also be a part of the route to a destination that is estimated based on the travel history of the vehicle/user. The navigation device 230 refers to the map information 241, which will be described later, and the like to specify the travel lane in which the vehicle travels.

The output device 250 includes a display 251 and a speaker 252. The output device 250 outputs various information items regarding the driving control to the user or occupants of surrounding vehicles. The output device 250 outputs information regarding the amount of misalignment between the travel lane and the lane of the map information 241, the change content of the first information and/or the second information, the created driving action plan, and the driving control based on the driving action plan. The output device 250 may output various information items regarding the driving control to an external device of the Intelligent Transport System or the like via a communication device.

The vehicle sensor 260 has a steering angle sensor 261, a vehicle speed sensor 262, and an attitude sensor 263. The steering angle sensor 261 detects information such as a steering amount, a steering speed, and steering acceleration and outputs the detected information to the vehicle controller 280. The vehicle speed sensor 262 detects the speed and/or acceleration of the vehicle and outputs the detected speed and/or acceleration to the vehicle controller 280. The attitude sensor 263 detects the position of the vehicle, the pitch angle of the vehicle, the yaw angle of the vehicle, and the roll angle of the vehicle and outputs the detected values to the vehicle controller 280. The attitude sensor 263 includes a gyro sensor.

The lane-keeping device 270 detects the travel lane from the images captured by the camera 221. The lane-keeping device 270 has a lane departure prevention function (lane-keeping support function) of controlling the movement of the vehicle so as to keep a certain relationship between the position of a lane marker of the lane and the position of the vehicle. The driving control apparatus 400 controls the movement of the vehicle so that the vehicle travels at a certain lateral position (e.g., the center) of the lane. The lane marker is not limited, provided that it has a function of defining a lane. The lane marker may be a line drawn on a road surface, a planting that exists between lanes, or a road structure that exists on the side of a road shoulder of a lane, such as a guardrail, a curbstone, a sidewalk, a traffic strip, or an exclusive road for two wheels. The lane marker may also be a stationary object that exists on the side of a road shoulder of a lane, such as an advertising display, a traffic sign, a store, or a roadside tree.

The vehicle controller 280 according to one or more embodiments of the present invention executes the driving control for the vehicle in accordance with the driving plan created by a driving control processor 411. The vehicle controller 280 operates the vehicle sensor 260, the drive device 290, and the steering device 295. The vehicle controller 280 acquires vehicle information from the vehicle sensor 260. The vehicle controller 280 according to one or more embodiments of the present invention is an onboard computer such as an electronic control unit (ECU) and electronically controls the driving/operation of the vehicle. The vehicle according to one or more embodiments of the present invention may be, for example, an electric car having an electric motor as the traveling drive source, an engine car having an internal-combustion engine as the traveling drive source, or a hybrid car having both an electric motor and an internal combustion engine as the traveling drive sources. Examples of the electric car or hybrid car having an electric motor as the traveling drive source include a type in which the power source for the electric motor is a secondary battery and a type in which the power source for the electric motor is a fuel cell. The content of control executed by the lane-keeping device 270 may be executed by the vehicle controller 280.

The drive device 290 according to one or more embodiments of the present invention includes a drive mechanism of the vehicle. The drive mechanism includes an electric motor and/or an internal-combustion engine as the above-described traveling drive sources, a power transmission device including a drive shaft and an automatic transmission that transmit the output of the traveling drive sources to the drive wheels, a braking device that brakes the wheels, and other necessary components. The drive device 290 generates respective control signals for these components of the drive mechanism and executes the driving control including acceleration/deceleration of the vehicle. These control signals for the drive mechanism are generated based on input signals by an accelerator operation and a brake operation and control signals acquired from the vehicle controller 280 or the driving control apparatus 400. Control information may be transmitted to the drive device 290, which can thereby perform the driving control including acceleration/deceleration of the vehicle in an automated or autonomous manner. In the case of a hybrid car, the drive device 290 may receive a ratio of the torque output to the electric motor and the torque output to the internal-combustion engine in accordance with the traveling state of the vehicle.

The steering device 295 according to one or more embodiments of the present invention includes a steering actuator. The steering actuator includes a motor and other necessary components attached to the steering column shaft. The steering device 295 executes the control of changing the traveling direction of the vehicle on the basis of a control signal acquired from the vehicle controller 280 or an input signal by the steering operation. The vehicle controller 280 transmits the control information including the steering amount to the steering device 295 thereby to execute the control of changing the traveling direction. Control of the drive device 290 and/or control of the steering device 295 may be performed in a completely automated or autonomous manner or in a form of assisting with the drive operation (traveling operation) by the driver. Control of the drive device 290 and control of the steering device 295 can be suspended/canceled due to an intervention operation by the driver.

The driving control apparatus 400 will then be described.

The driving control apparatus 400 includes a control device 410, a storage device 420, and a communication device 430. The driving control apparatus 400 may further include an output device. The output device serves in the same manner as the previously described output device 250 of the onboard apparatus 200. The control device 410 and the storage device 420 can exchange information with each other via a wired or wireless communication line. The communication device 430 performs information exchange with the onboard apparatus 200, information exchange inside the driving control apparatus 400, and information exchange between external devices and the driving control system 1.

The control device 410 includes a driving control processor 411. The driving control processor 411 is a computing device that performs a driving control process including the creation of a driving plan of the vehicle. Specifically, the driving control processor 411 is a computer including a read only memory (ROM) that stores programs for executing the driving control process including the creation of a driving plan, a central processing unit (CPU) as an operation circuit that executes the programs stored in the ROM to serve as the control device 410, and a random access memory (RAM) that serves as an accessible storage device.

In the driving control process, the control device 410 refers to travel environment information 24 generated by the travel environment information generation apparatus 100 at a predetermined processing cycle. The driving control processor 411 performs the driving control process using the generated travel environment information 24.

The travel environment information generation apparatus 100 will be described. The travel environment information generation apparatus 100 according to one or more embodiments of the present invention is not limited in its form, and a part thereof may be equipped in a vehicle or may also be applied to a portable terminal device capable of exchanging information with the onboard apparatus 200, the driving control apparatus 400, and/or the server 300. Examples of the terminal device include devices such as a smartphone and a PDA.

The travel environment information generation apparatus 100 includes a control device 10, a storage device 20, and a communication device 30. The control device 10 includes a processor 11 that executes a process of generating the travel environment information 24. The processor 11 is a computing device having an information processing function of performing the process of generating the travel environment information 24.

The processor 11 is a computer including a read only memory (ROM) that stores programs for executing the process of generating the travel environment information 24, a central processing unit (CPU) as an operation circuit that executes the programs stored in the ROM to serve as the control device 10, and a random access memory (RAM) that serves as an accessible storage device. The control device 10 according to one or more embodiments of the present invention executes each function by cooperation of software for achieving the above functions and the above-described hardware.

The travel environment information 24 according to one or more embodiments of the present invention is used in the travel control process including the automated or autonomous driving.

The travel environment information 24 according to one or more embodiments of the present invention is generated (provided/formed) by compositing the first information and the second information. The first information is information regarding an actual and real environment (environment during the traveling) detected by the detection device 220 of a vehicle. The second information is information regarding lanes acquired from the map information 21. The travel environment information 24 is information in which the first information and the second information are edited into one information item and which can be referred to by the driving control apparatus 400.

The travel environment information 24 according to one or more embodiments of the present invention is generated by compositing the first information and the second information. The compositing process for the first information and the second information includes a connecting process, an integrating process, or a changing (modifying) process for the first information and the second information.

The connecting process is a process of connecting information regarding the travel lane included in the first information, information regarding an area including the travel lane, and information regarding lanes included in the second information or information regarding areas including the lanes (including map information) so that the continuity of information is maintained.

The integrating process is a process of assembling/aggregating/superimposing information regarding the travel lane included in the first information, information regarding an area including the travel lane, and information regarding lanes included in the second information or information regarding areas including the lanes (including map information) so that the continuity of information is maintained.

The modifying process is a process of changing the content of the first information or the second information or the content of the first information and the second information and changing/modifying any one of the first information and the second information on the basis of the first information or the second information. In one or more embodiments of the present invention, the first information based on the detection information may be evaluated as information that reflects the environment of the real space (information representing the travel environment which is approximate to the actual situation), and the content of the second information may be modified (changed) with reference to the first information.

In the compositing process, any one of the connecting process for the first information and the second information, the integrating process for the first information and the second information, and the modifying process may be executed, or a combination of two or more of the processes is executed. The compositing process is performed so that the continuity of the information regarding the travel lane is maintained. The first information and the second information are composited so that the position of the travel lane is not misaligned and the information on lane markers of the travel lane is not interrupted.

From the viewpoint of ensuring the continuity of the travel environment information generated by compositing the first information and the second information, the processor 11 composites the first information and the second information to generate the travel environment information so that the travel lane is connected to the target lane of the map information 21 corresponding to the travel lane. Ideally, the travel lane and the target lane have the same shape, and it is therefore expected that these lanes are connected smoothly. The connection between the travel lane and the target lane can ensure the continuity of the first information and the second information. The processor compares the coordinates of the first information including the travel lane with the coordinates of the map information 21 including the target lane to calculate a connection point between the travel lane and the target lane. When the connection point can be calculated, the travel lane and the target lane are connected to calculate a travel route. This travel route is used as a movement route when the subject vehicle is controlled to autonomously travel. The travel route is a route that includes a connection point of the travel lane and the target lane.

From the viewpoint of the continuity of the travel lane and the target lane, the first information based on the detection information from a sensor and the second information based on the high-definition map information 21 can be appropriately composited. While referring to the map information 21, it is possible to obtain the travel environment information and the travel route which reflect the actual situation.

The travel route farther than the connection point (on the destination side) may be the target lane based on the second information based on the map information 21 which is preliminarily prepared, and the travel route nearer than the connection point (on the subject vehicle side) may be the travel lane of the first information based on the detection result from a sensor. By using the target lane of the map information 21 while considering the actual travel environment, it is possible to obtain the travel route from the current position of the subject vehicle to the far side. It is possible to obtain a highly accurate travel route for controlling the subject vehicle to autonomously travel.

The processor 11 acquires the first information and the second information regarding a lane existing at a position farther than the travel environment which can be acquired based on the first information. The first information is obtained from the detection information from an onboard sensor. The detection range (distance) of the onboard sensor is finite, and the first information regarding the route to the destination may not be obtained. On the other hand, the second information is the map information 21 which is preliminarily prepared, and it is possible to acquire the travel environment at a position separated from the subject vehicle. The processor 11 acquires the first information regarding the travel environment near the subject vehicle and the second information regarding the travel environment far from the subject vehicle and composites the first information and the second information so that the travel lane and the target lane are connected to each other, thereby to obtain the travel environment information regarding the travel route from the near side to the far side. The travel lane and the target lane are connected to each other and, therefore, the first information based on the sensor detection information and the second information based on the high-definition accurate map information 21 can be composited while maintaining the continuity. It is possible to obtain an accurate travel route with reference to the map information 21 also for the far side while putting importance on the travel environment information which reflects the actual situation on the near side. The obtained travel route is a route for the autonomous traveling of the subject vehicle.

The content of processes executed by the control device 10 will be described. The control device 10 composites the first information and the second information to generate the travel environment information 24. The generated travel environment information 24 may be stored in the storage device 20 or may also be stored in the storage device 20 of the onboard apparatus 200 which is accessible.

The control device 10 executes the process of acquiring the first information. The first information is information based on the detection information from a sensor equipped in the subject vehicle.

The onboard sensors includes the detection device 220 and the vehicle sensor 260. The detection information includes the images captured by the camera 221 of the detection device 220, which will be described later, and information obtained from the captured images. The detection information includes detection signals from the radar device 222 and information obtained from the detection signals. The detection information includes information regarding the behavior of the vehicle detected by the vehicle sensor 260. The detection information includes current positional information. The current positional information may be detected by the position detection device 223 of the detection device 220 or may also be detected by the position detection device 231 of the navigation device 230, which will be described later.

The onboard sensors includes a reception device 224 that receives the detection information provided by an external information provision system such as the Intelligent Transport System (ITS) using the communication device 210. The reception device 224 may acquire images captured by a camera device installed on a road via short-range wireless communication. The reception device 224 may acquire the detection information (including captured images) from another vehicle via short-range wireless communication. The detection information received by the reception device 224 equipped in the subject vehicle is used as the detection information at the current position of the subject vehicle which travels.

The control device 10 identifies a "travel lane" that is the lane to which the current position of the subject vehicle belongs and in which the subject vehicle travels. The travel lane can be identified based on the current position of the subject vehicle, and the traveling position in the travel lane can be specified. The position of the travel lane may be determined based on the coordinates of an image captured by the camera 221 and/or the vehicle position detected by the vehicle sensor 260. The travel lane may be specified based on the determination made by the navigation device 230.

The first information according to one or more embodiments of the present invention is information regarding the surrounding travel environment including the travel lane in which the subject vehicle travels, which information is based on the detection information from sensors (including the detection device 220, the vehicle sensor 260, and the position detection device 231) equipped in the subject vehicle. The first information is information regarding the travel lane of a road in which the subject vehicle travels and the road including the travel lane. The information regarding the travel lane of the first information includes lane marker information that defines the travel lane. The first information is information regarding the travel lane and includes identification information of the travel lane. The first information is information regarding the road including the travel lane and includes identification information of the road including the travel lane. In the first information, the identification information of the travel lane and the identification information of the road including the travel lane are associated with each other. That is, when the travel lane is specified by the identification information, information regarding the road to which the travel lane belongs can be acquired.

The control device 10 acquires the second information from the map information 21 stored in the storage device 20. The second information is information regarding lanes of a road. The second information includes information for identifying one target lane from a plurality of lanes of a road. The second information includes lane marker information of each lane of a road. The lane marker information of each lane refers to information on the position, form, or attribute of the lane marker. The second information is a part or all of the map information 21.

The storage device 20 according to one or more embodiments of the present invention stores the map information 21, lane information 22, and traffic regulation information 23. The map information 21 is high-definition digital map information (high-definition map, dynamic map). The map information 21 according to one or more embodiments of the present invention is used in the driving control process executed by the driving control apparatus 400. The map information 21 has two-dimensional information and/or three-dimensional information.

In one or more embodiments of the present invention, a form in which the map information 21 is stored in the storage device 20 of the travel environment information generation apparatus 100 will be described, but the map information 21 may be stored in the storage device 240 of the onboard apparatus 200, a storage device 320 of the server 300 that is readable/writable via the communication device 30, or the storage device 420 of the driving control apparatus 400. FIG. 1 illustrates pluralities of map information pieces (21, 241, 321), lane information pieces (22, 242, 322), and traffic regulation information pieces (23, 243, 323), but at least one of these can be configured in an accessible state.

When one road includes a plurality of lanes, identification information is provided for identifying one target lane from these lanes. Each lane is specified by positional information (map coordinate values) such as latitude/longitude, and which lane (N-th) the lane is may be specified using the identification information. When a plurality of lanes belongs to a road, each lane and the road to which the lane belongs are associated with each other by the identification information. The map information 21 has the identification information for specifying each single lane and connection destination lane information for identifying a connection destination lane of each lane.

The "lane" in one or more embodiments of the present invention is an area in which vehicles existing along the extending direction of a road can travel. When a road has a plurality of lanes arranged in parallel, each "lane" can be identified by a difference in the position (coordinates) along the width direction of a road. The lane includes one or more links. A link is partitioned on the lane by nodes that are two end points separated in the extending direction of the lane. The links corresponding to lanes arranged in parallel on a road can be identified by the positions (coordinates) along the width direction of the road and by the positions (coordinates) along the extending direction of the road.

The map information 21 according to one or more embodiments of the present invention includes identification information for specifying each lane and information for specifying the next consecutive lane. The map information 21 allows a reading process to be executed by the driving control apparatus 400. In the automated or autonomous driving control process, the driving control apparatus 400 can refer to the map information 21 thereby to autonomously move (drive) the vehicle along the target route and estimate the lane in which the vehicle will travel in the future.

The map information 21 includes the lane information 22. Each road included in the map information 21 is specified by the positional information (map coordinate values) such as latitude/longitude and also specified by the identification information for specifying the road. The lane information 22 includes road type information, road attribute information, width information of roads, road shape information (such as a curvature radius and an intersection structure), information on intersection points on roads (merging points, branching points), inbound/outbound information (up-line/down-line information) of roads, information on the number of lanes, information on the number of inbound lanes (up-direction lanes), information on the number of outbound lanes (down-direction lanes), and information on lane markers (boundaries) of roads (such as broken lines, solid lines, color, planting, guardrails, structure types, blocks, and lighting type displays). These information items are associated with the identification information of roads. The lane information 22 also includes lane type information (branching, merging, intersecting), lane attribute information (such as right turn lanes, left turn lanes, and straight lanes), width information of lanes, lane shape information (such as curvature radii and intersection structures), information on intersections (merging points, branching points) on lanes, inbound/outbound information (up-line/down-line information) of lanes, information on the number of adjacent lanes, information on the number of inbound lanes, information on the number of outbound lanes, and information on lane markers (boundaries) of lanes (such as broken lines, solid lines, color, planting, guardrails, structure types, blocks, and lighting type displays). These information items are associated with the identification information of lanes.

The map information 21 includes the traffic regulation information 23. The traffic regulation information 23 represents traffic rules on a route, such as STOP, NO PARKING/NO STOPPING, SLOW, and SPEED LIMIT, which vehicles must follow when traveling. The traffic regulation information 23 includes information on one-way traffic, entry prohibition, temporary stop, the priority relationship in traveling, whether or not the overtaking is permitted (whether or not the lane change to an adjacent lane is permitted), parking prohibition, parking permission, etc. Each rule is defined for each point (latitude, longitude), each link, and each lane. The traffic regulation information 23 may include information on traffic signals acquired from a device provided on the road side.

The control device 10 refers to the above-described map information 21 stored in the storage device 20 to acquire the second information regarding lanes of a road.

The second information is any one or more of information items of the positional information such as coordinate values of lane markers, information for identifying which forms of lines the lane markers have, such as solid lines, broken lines, and yellow lines, and information for identifying which forms of structures of traffic strips the lane markers have, such as curbstones, planting, and guardrails. The lane marker information is attached with the identification information of the position of each lane (N-th, right/left side). This allows the forms of lane markers of the N-th lane, the form of a lane marker on the right side of the lane, and the form of a lane marker on the left side of the lane to be specified. That is, the map information 21 includes, for each lane, information on a combination of lane markers, such as the lane marker on the left side being a solid line and the lane marker on the right side being a curbstone. Such information is stored for each lane as the second information.

The identification information of a travel lane of the first information and the identification information of a target lane of the second information corresponding to the travel lane can be associated with each other. From the identification information of the first information regarding one travel lane A, a travel lane (target lane) B on the map information corresponding to the travel lane A and the second information of the travel lane (target lane) B can be extracted. For example, the control device 10 specifies the road to which the travel lane for the subject vehicle to travel belongs (obtains the identification information of the road) on the basis of the positional information of the first information, the road guidance sign included in a captured image in the first information, the identification information of the target lane of the second information corresponding to the travel lane, or the like. The control device 10 further specifies the travel lane in which the subject vehicle travels (obtains the identification information of the travel lane) from the image of a line of preceding vehicles included in the captured image in the first information. The control device 10 reads the identification information of the travel road and the identification information of the travel lane from the lane information 22 stored in the storage device 20.

The control device 10 determines whether or not the travel road to which the travel lane belongs is a predetermined specific road, on the basis of the first information. The control device 10 specifies the travel road to which the travel lane belongs from the positional information of the first information and refers to the lane information 22 to extract the features of the travel road. On the basis of the captured image in the first information, the control device 10 extracts the features of the travel road to which the travel lane belongs from the number and forms of lane markers extracted from the image of lane markers captured ahead of the subject vehicle. On the basis of the captured image in the first information, the control device 10 extracts the features of the travel road to which the travel lane belongs from the image or the like of a line of vehicles captured ahead of the subject vehicle.

The control device 10 according to one or more embodiments of the present invention limits the scene/timing in which the process of generating the travel environment information 24 is performed. The control device 10 determines whether or not the travel road is a predetermined specific road, on the basis of the features of the travel road obtained based on the first information. When a determination is made that the travel road to which the travel lane belongs is a specific road, the control device 10 composites the first information and the second information to generate the travel environment information 24.

The control device 10 determines whether or not the travel road is a specific road that satisfies a predetermined condition, on the basis of the first information or the second information or on the basis of the first information and the second information. The predetermined condition which is a criterion for determining whether or not the road is a specific road is preliminarily defined.

In one or more embodiments of the present invention, the predetermined condition which defines the specific road is defined from the viewpoint of specifying a "unique lane." Although not particularly limited, examples of the definition of the specific road will be described below.

(1) The specific road can be defined as a road (travel road) in which the number of lanes belonging to the road is a predetermined number.

The larger the number of lanes belonging to one road, the more difficult it is to specify a unique lane. By defining the specific road on the basis of the number of lanes belonging to one road, it is possible to limit the situation/scene/timing in which the unique lane is readily specified from among lanes belonging to the road. The number of lanes may be a limited numerical value or may also be represented by a numerical range defined by an upper limit and/or a lower limit.

Even in a case in which the travel road includes a plurality of lanes, when the number of lanes is a predetermined number, a determination can be made that the situation/scene/timing is suitable for execution of the process of generating the travel environment information 24. The control device 10 generates the travel environment information 24 when traveling on the specific road suitable for generating the travel environment information 24 and can therefore generate the travel environment information 24 with a small difference from the actual environment.

The control device 10 uses the first information to calculate the number of lanes belonging to the road (travel road). On the basis of the captured image in the first information, the control device 10 can calculate the number of lanes from the number of lane markers of the travel road included in the captured image. The number of lanes can be calculated from the number of lines of other vehicles traveling ahead on the travel road included in the captured image in the first information. The control device 10 uses the second information to calculate the number of lanes belonging to the road (travel road). The second information includes the number of lanes of the road to which the target lane corresponding to the travel lane belongs. The control device 10 can use the first information and the second information to calculate the number of lanes belonging to the road (travel road). The number of travel lanes can be calculated by referring to the second information associated with the road in the map information corresponding to the travel road to which the current position of the first information belongs.

(2) The specific road can be defined as a road in which the number of lanes in the inbound direction (up-direction) of the travel road is one and the number of lanes in the outbound direction (down-direction) of the travel road is one. The traveling direction in a lane can be identified using the first information (alone) or the first information and the second information. When belonging to a road in which the number of lanes in the inbound direction is one and the number of lanes in the outbound direction is one, a unique lane can be specified with a high degree of certainty. In other words, the specific road in this example is a road that includes a single inbound lane and a single outbound lane.

When the travel road of the subject vehicle includes only one lane on the road in the same traveling direction, a determination can be made that the situation/scene/timing is suitable for execution of the process of generating the travel environment information 24. The control device 10 generates the travel environment information 24 when traveling on the specific road suitable for generating the travel environment information 24 and can therefore generate the travel environment information 24 with a small difference from the actual environment.

The control device 10 uses the first information to identify whether the road/lane is in the inbound (up) direction or the outbound (down) direction on the basis of the moving direction of another vehicle extracted from the change over time in the captured image included in the first information. The traveling direction (inbound or outbound direction/up or down direction) of a lane can be detected from the change over time in the current position of the first information. The traveling direction (inbound or outbound direction/up or down direction) of a lane can be detected from the change over time in the captured image in the first information. The image is captured by the camera 221. The traveling direction (inbound or outbound direction/up or down direction) of a lane can be detected from the acceleration from the vehicle speed sensor 262.

On the basis of the captured image in the first information, the control device 10 calculates the number of lanes from the number of lane markers of the travel road included in the captured image and determines whether or not the number of lanes in the inbound direction and the number of lanes in the outbound direction are both one. The control device 10 calculates the number of lanes from the number of lines of other vehicles traveling ahead on the travel road included in the captured image in the first information and determines whether or not the number of inbound or outbound lanes is one.

The control device 10 can use the second information to determine whether or not the number of lanes in the inbound direction of the travel road and the number of lanes in the outbound direction of the travel road are both one. The second information includes the number of lanes of the road to which the target lane corresponding to the travel lane belongs. The second information includes information as to whether or not the target lane corresponding to the travel lane is included in a road in which the number of lanes in the inbound direction is one and the number of lanes in the outbound direction is one.

The control device 10 uses the first information and the second information to determine whether or not the number of lanes belonging to the road (travel road) is one. The number of travel lanes can be obtained by referring to the second information associated with the road of the map information corresponding to the travel road to which the current position of the first information belongs, and a determination can be made as to whether or not the number of travel lanes is one.

(3) The specific road can be defined as a road in which the number of lanes in the inbound direction or outbound direction of the travel road is one. That is, the specific road is a road in which one lane in the inbound direction or the outbound direction is one-way. With the above-described scheme, the traveling direction of a lane can be identified using the first information (alone) or the first information and the second information. When the road is one-way, a unique lane can be specified with a high degree of certainty. When belonging to a road in which the number of lanes in the inbound direction is one or the number of lanes in the outbound direction is one, a unique lane can be specified with a high degree of certainty.

When the travel road of the subject vehicle is a road in which the number of lanes in the inbound direction or the outbound direction is one, a determination can be made that the situation/scene/timing is suitable for execution of the process of generating the travel environment information 24. The control device 10 can generate the travel environment information 24 when traveling on the specific road suitable for generating the travel environment information 24 and can therefore generate the travel environment information 24 with a small difference from the actual environment.

With the above-described scheme, the control device 10 uses the first information to identify whether the road/lane is in the inbound direction or the outbound direction. With the above-described scheme, the control device 10 calculates the number of lanes using the first information and determines whether or not the number of lanes in the inbound direction or the outbound direction is one. Thus, the control device 10 identifies whether the road/lane is in the inbound direction or the outbound direction. The specific road of this example includes a single inbound or outbound lane.

With the above-described scheme, the control device 10 can use the second information to determine whether or not the number of lanes in the inbound direction or outbound direction of the travel road is one.

The control device 10 uses the first information and the second information to determine whether or not the number of lanes belonging to the road (travel road) is one. The number of travel lanes can be obtained by referring to the second information associated with the road of the map information corresponding to the travel road to which the current position of the first information belongs, and a determination can be made as to whether or not the number of travel lanes is one.

(4) The specific road can be defined as a road in which the number of lanes of the travel road changes from two or more to one. Such a road is a road in which the number of lanes of the travel road is two or more at the current position, but the lanes merge into a single lane at a position on the traveling direction side. When the number of lanes belonging to a road is one, it is easier to specify a unique lane than when the number of lanes is two or more. That is, even when the number of lanes of the travel road is two or more at the current position of the subject vehicle which is traveling, it can be expected that in a situation in which the number of lanes changes to one (two or more lanes merge into a single lane) at a position at which the subject vehicle will travel in the future (position on the downstream side in the traveling direction), continuation of the traveling (elapse of time) makes a situation in which a unique lane will be readily specified in the future. Even when the number of lanes of the travel road to which the current position belongs is two or more, a determination can be made that the situation/scene/timing is suitable for execution of the process of generating the travel environment information 24, provided that the number of lanes of the travel road is expected to be one in the future. The control device 10 generates the travel environment information 24 when it can be expected that the vehicle will travel on the specific road suitable for generating the travel environment information 24, and can therefore generate the travel environment information 24 with a small difference from the actual environment in the near future.

When a determination is made that the number of lanes of the travel road on which the vehicle is currently traveling changes from two or more to one, it can be expected that the situation/scene/timing suitable for execution of the process of generating the travel environment information 24 will be obtained in the near future. For example, such a scene is a scene in which the travel road on the upstream side of an intersection (or a merging point) includes two or more lanes, but the consecutive lanes of the travel road after passing through the intersection merge into a single lane. The control device 10 generates the travel environment information 24 when it is expected that the vehicle will travel on the specific road suitable for generating the travel environment information 24, and it can therefore be expected that the travel environment information 24 is generated with a small difference from the actual environment.

The control device 10 uses the first information to calculate the number of lanes belonging to the road (travel road). When a determination is made that the number of lanes at the current position of the subject vehicle is two or more on the basis of the captured image in the first information and a determination is further made that the number of lanes will be one from the captured image of an area located ahead of the subject vehicle (an area separated by a predetermined distance or more in the traveling direction from the current position of the subject vehicle), the control device 10 determines that the subject vehicle is traveling on the specific road. The number of lanes can be determined based on the number of lane markers of the travel road extracted from the captured images of an area including the current position and an area located ahead of the subject vehicle. The number of lanes can be determined based on the number of lines of other vehicles traveling ahead extracted from the captured images of an area including the current position and an area located ahead of the subject vehicle.

The control device 10 refers to the second information to acquire the number of lanes belonging to the travel road including the current position and the number of lanes belonging to the travel road in an area separated by a predetermined distance or more in the traveling direction from the current position. The control device 10 can acquire information on the travel lane including the current position and connection links connected to the travel lane on the basis of the current position detected by the position detection device 231 and the lane information 22 of the map information 21. From the information on the connection links included in the lane information 22, the number of lanes of the travel road at the current position and the number of lanes of the travel road at a point separated by a predetermined distance or more in the traveling direction from the current position can be acquired. Even when the number of travel lanes including the current position is two or more, a determination can be made that the vehicle is traveling on the specific road, provided that the lanes are expected to enter a single road after passing through the point at which the number of lanes changes (intersection/merging point).

The control device 10 uses the first information and the second information to acquire the number of lanes belonging to the travel road including the current position and the number of lanes belonging to the travel road in an area separated by a predetermined distance or more in the traveling direction from the current position. The number of the travel lanes can be calculated by referring to the travel road to which the current position of the first information belongs and the second information regarding a road in the map information corresponding to the travel road to which the position separated by a predetermine distance in the traveling direction from the current position belongs.

(5) The specific road can be defined as a road in which the number of lanes of the travel road is two or more and the travel road can be specified as to which lane of the lanes of the travel road the vehicle is traveling in, on the basis of the patterns of lane markers that define the lanes belonging to the travel road. For example, when two or more lanes belonging to a road are lanes having different forms (patterns) of lane markers, the travel lane can be specified based on the patterns of lane markers. The patterns of lane markers include a form of the right-side lane marker defining a lane, a form of the left-side lane marker, or a form of a combination of the right and left lane markers. For example, when a road includes a unique lane in which the lane marker on the right side is a yellow solid line and the lane marker on the left side is a broken line of a white line, the unique lane can be specified.

Even in a case in which the number of lanes of the travel road to which the current position belongs is two or more, when the vehicle is traveling on a road in which it is possible to specify which lane the vehicle is traveling in on the basis of the patterns of lane markers, a determination can be made that the situation/scene/timing is suitable for execution of the process of generating the travel environment information 24. The control device 10 generates the travel environment information 24 when a determination can be made that the vehicle is traveling on the specific road suitable for generating the travel environment information 24, and can therefore generate the travel environment information 24 with a small difference from the actual environment.

The control device 10 uses the first information to recognize the patterns of lane markers of a lane belonging to the road (travel road). On the basis of the captured image in the first information, the control device 10 can specify a lane from the patterns of lane markers of the travel road included in the captured image. The patterns of lane markers are extracted from the captured image. Lane markers are boundary lines (solid lines/broken lines), curbstones, planting, guardrails, road studs, etc. extending (scattered) in the traveling direction. The patterns of lane markers are represented by the type, color, and form of the lane markers. The control device 10 identifies the type of lane markers using a pattern matching process by comparing the image of a lane marker extracted from the captured image with a reference image pattern that is preliminarily stored.

The control device 10 uses the second information to recognize the patterns of lane markers of lanes belonging to the road (travel road). The second information includes the features of lane markers that define lanes. The features of lane markers are stored as the second information for each lane. The features of lane markers include the form of the lane markers (solid line, broken line, color) and the structure of the lane markers (traffic strip such as curbstone, planting, guardrail, or road stud). The features of lane markers include the features of a right-side lane marker and the features of a left-side lane marker for each lane. The patterns of lane markers are defined by the features of a pair of lane markers on the right and left of a lane. Even when the number of travel lanes is two or more, a unique lane can be specified with a high degree of certainty, provided that the features of lane markers of the lanes are different. Thus, by defining the specific road as a road in which the features of lane markers of two or more lanes belonging to one road are all different, it is possible to specify travel lanes in a state in which the unique lane is readily specified.

The control device 10 uses the first information and the second information to recognize the patterns of lane markers belonging to the travel road. The features on the image of lane markers of a lane belonging to the travel road are acquired from the captured image included in the first information. The patterns of lane markers of the travel lane are recognized by referring to the second information regarding a road of the map information corresponding to the travel road to which the current position of the first information belongs.

The patterns of lane markers of the travel lane can be recognized by referring to the second information associated with a road of the map information corresponding to the travel road to which the current position of the first information belongs, and one lane can be specified based on the patterns of the lane markers.

When the road in the inbound direction or the outbound direction has two or more lanes, it may not be possible to extract the unique lane corresponding to the travel lane. The pattern of the right-side lane marker and the pattern of the left-side lane marker of a road including two or more lanes may be different.

(6) The specific road can be defined as a road in which the number of lanes in the inbound direction or the outbound direction of the travel road is two or more and it is possible to specify which lane of the two or more lanes of the travel road the vehicle is traveling in, on the basis of the patterns of lane markers that define the lanes in the inbound direction or the lanes in the outbound direction. For example, when two or more lanes belonging to a road in the inbound direction are lanes having different forms (patterns) of lane markers, or when two or more lanes belonging to a road in the outbound direction are lanes having different forms (patterns) of lane markers, the travel lane can be specified based on the patterns of lane markers.

Even in a case in which the number of lanes in the inbound direction or the outbound direction of the travel road to which the current position belongs is two or more, when it is possible to specify which lane the vehicle is traveling in on the basis of the patterns of lane markers, a determination can be made that the situation/scene/timing is suitable for execution of the process of generating the travel environment information 24. The control device 10 can generate the travel environment information 24 when traveling on the specific road suitable for generating the travel environment information 24.

With the above-described scheme, the control device 10 uses the first information to identify whether the road/lane is in the inbound direction or the outbound direction. With the above-described scheme, the control device 10 recognizes the patterns of lane markers of the lanes belonging to the road (travel road) for each of the inbound direction and the outbound direction. The patterns of lane markers are as described above. On the basis of the captured image in the first information, the control device 10 can specify one lane from among the lanes in the inbound direction or the outbound direction on the basis of the patterns of lane markers of the travel road included in the captured image.

With the above-described scheme, the control device 10 can use the second information to recognize the patterns of lane markers of the lanes in the inbound direction or the outbound direction belonging to the road (travel road). The second information in this example includes information as to whether the road or each lane is in the inbound direction or the outbound direction.

With the above-described scheme, the control device 10 uses the first information and the second information to recognize the patterns of lane markers of the lanes in the inbound direction or the outbound direction belonging to the travel road. The patterns of lane markers of the travel lane can be recognized by referring to the second information associated with a road of the map information corresponding to the travel road to which the current position of the first information belongs, and one lane can be specified based on the patterns of the lane markers. The second information in this case includes information as to whether the road or each lane is in the inbound direction or the outbound direction.

When the subject vehicle is traveling on a road with two or more oncoming lanes, it may not be possible to extract a unique target lane corresponding to the travel lane. In such a case, a determination is made as to whether or not the travel road is a specific road on the basis of the patterns of lane markers of the lanes in the inbound direction or the outbound direction.

(7) The specific road can be defined as a road in which the number of lanes in the inbound direction or the number of lanes in the outbound direction of the travel road is two or more and the lanes in the inbound direction or the lanes in the outbound direction are defined by predetermined characteristic lane markers. The characteristic lane markers include the forms of lane markers (solid lines, broken lines, color) and the structures of lane markers (traffic strips such as curbstones, planting, guardrails, and road studs). One lane can be specified when the lane has characteristic lane markers.

Even in a case in which a road has two or more lanes in the same traveling direction, when the lane markers of lanes are "predetermined lane markers," a determination can be made that the situation/scene/timing is suitable for execution of the process of generating the travel environment information 24. A case will be discussed in which, for example, among the lane markers of two or more lanes in the inbound direction or the outbound direction, the lane marker on the most oncoming road side is planting and the lane marker on the outermost side (on the opposite side to the oncoming road) is a curbstone. In this case, the lane having the lane marker of planting can be specified as a unique lane on the most oncoming road side. In addition, the lane having the lane marker of a curbstone can be specified as a unique lane on the outermost side. The control device 10 generates the travel environment information 24 when traveling on the specific road suitable for generating the travel environment information 24, and can therefore generate the travel environment information 24 with a small difference from the actual environment.

With the above-described scheme, the control device 10 uses the first information to identify whether the road/lane is in the inbound direction or the outbound direction. With the above-described scheme, the control device 10 recognizes the patterns of lane markers of the lanes belonging to the road (travel road) for each of the inbound direction and the outbound direction. When the lane markers are defined by predetermined characteristic lane markers, one lane can be specified from among the lanes in the inbound direction or the outbound direction on the basis of the patterns of the lane markers of the travel road extracted from the captured image. The control device 10 can identify whether or not the captured lane markers are "predetermined characteristic lane markers" using a pattern matching process by comparing the image of lane markers extracted from the captured image with a reference image pattern of the "predetermined characteristic lane patterns" that is preliminarily stored. For example, there is a case in which among the lane markers of two or more lanes, the lane marker on the most oncoming road side is planting and the lane marker on the outermost side (on the opposite side to the oncoming road) is a curbstone. In this case, the lane having the lane marker of planting can be specified as a lane on the most oncoming road side and the lane having the lane marker of a curbstone can be specified as a lane on the outermost side.

With the above-described scheme, the control device 10 uses the second information to recognize the patterns of lane markers of the lanes in the inbound direction or the outbound direction belonging to the road (travel road). The second information in this example includes information as to whether the road or each lane is in the inbound direction or the outbound direction. The second information in this example includes information in which the features of lane markers and the identification information of lanes are associated with each other.

The control device 10 uses the first information and the second information to determine whether or not the lane markers of the lanes in the inbound direction or the outbound direction belonging to the travel road are the predetermined lane markers. The features of lane markers of the travel lane can be recognized by referring to the second information associated with a road of the map information corresponding to the travel road to which the current position of the first information belongs, and one lane can be specified based on the lane markers being the "predetermined lane markers." The second information in this case includes information in which the features of lane markers are associated with the road or each lane.

When the subject vehicle is traveling on a road with two or more lanes, it may not be possible to extract a unique target lane corresponding to the travel lane. In such a case, a determination is made as to whether or not the travel road is a specific road on the basis of whether or not the lane markers of the travel lane are the predetermined lane markers.

Examples of the above-described specific road will be described with reference to FIG. 2A and FIG. 2B.

Figure 2A:
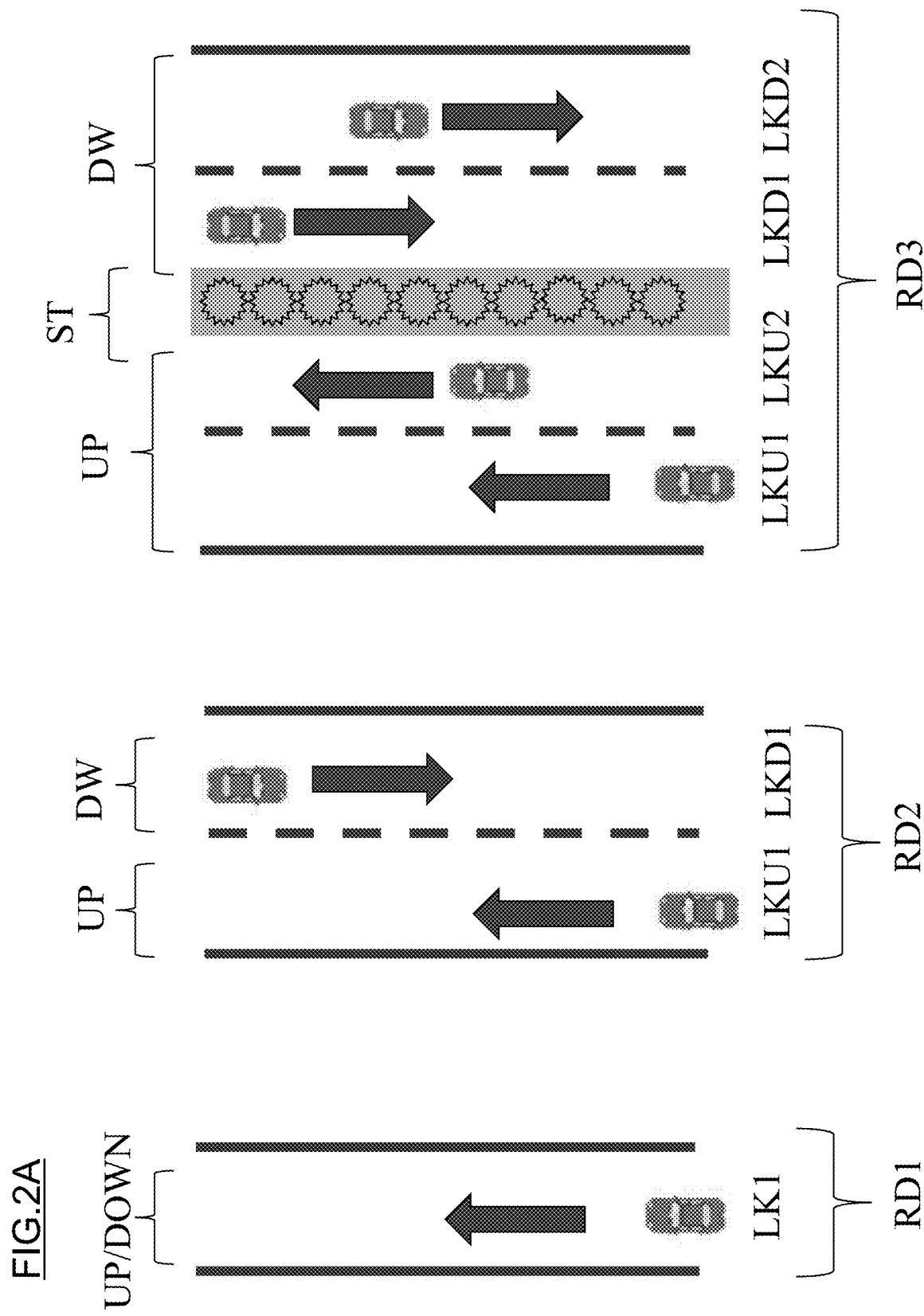
FIG. 2A is a set of diagrams for describing specific roads.

RD1 illustrated in FIG. 2A represents a so-called one-way road, which is a road in which the number of lanes in the inbound direction (indicated by "UP") or the outbound direction (indicated by "DOWN" or "DW) is one. Lane LK1 is a unique lane on the road RD1. When the travel road is a specific road in which the number of lanes is one, the travel lane can be specified with a high degree of certainty on the basis of the detection information. Moreover, there are no lanes taken by mistake and it is therefore highly likely that the travel lane of the specific road in which the number of lanes is one is accurately associated with the target lane of the map information 21. When the travel environment information 24 is generated by compositing the first information and the second information, it is highly likely that the determined travel lane and the target lane are accurately matched while traveling on the specific road. When traveling on such a specific road, the first information and the second information can be appropriately associated with each other, and it is therefore possible to generate the accurate travel environment information 24.

RD2 represents a road in which the number of lanes in the inbound direction and the number of lanes in the outbound direction are both one. Lane LKU1 is the lane in the inbound direction (or the outbound direction), and lane LKD1 is the lane in the outbound direction (or the inbound direction). As previously described, the traveling direction of a lane can be determined based on the first information and/or the second information. On a road in which the number of lanes in the inbound/outbound direction is one, the number of lanes along one traveling direction is limited to one, and the travel lane can therefore be specified with a high degree of certainty. When the number of lanes with a common traveling direction is one, there are no lanes taken by mistake and it is therefore highly likely that the travel lane and the target lane are accurately associated with each other. When the travel environment information 24 is generated by compositing the first information and the second information, it is highly likely that the determined travel lane and the target lane are accurately matched during the traveling on the specific road. When traveling on the specific road, the first information and the second information can be appropriately associated with each other, and it is therefore possible to generate the accurate travel environment information 24.

RD3 represents a road in which the number of lanes in the inbound direction or the number of lanes in the outbound direction is two. The number of lanes may be two or more. Lanes LKU1 and LKU2 are the lanes in the inbound direction (or in the outbound direction), and lanes LKD1 and LKD2 are the lanes in the outbound direction (or in the inbound direction). Even when the traveling direction of a lane can be identified, there are two or more lanes along one direction, and it is not possible to identify a unique lane only by identifying the traveling direction.

Fortunately, however, when focusing on the combination of two lane markers that define a lane, combinations of lane marker forms of the lanes LKU1 and LKU2 are different as in the road RD3. The right-side lane marker of the lane LKU1 is a broken line, and the left-side lane marker of the lane LKU1 is a solid line. The right-side lane marker of the lane LKU2 is planting, and the left-side lane marker of the lane LKU2 is a broken line. On such a road, the combination patterns of two lane markers of the lanes LKU1 and LKU2 are different, and the lane LKU1 and the lane LKU2 can be identified based on the patterns of the lane markers.

The control device 10 defines the specific road as a road to which two or more lanes having different lane marker patterns belong. When the lane marker patterns of two or more lanes are different, the possibility of taking lanes by mistake is low, and it is therefore highly likely that the travel lane and the target lane are accurately associated with each other. When the travel environment information 24 is generated by compositing the first information and the second information, it is highly likely that the travel lane and the target lane are accurately matched during the traveling on the specific road. When traveling on the specific road, the first information and the second information can be appropriately associated with each other, and it is therefore possible to generate the accurate travel environment information 24.

Figure 2B:
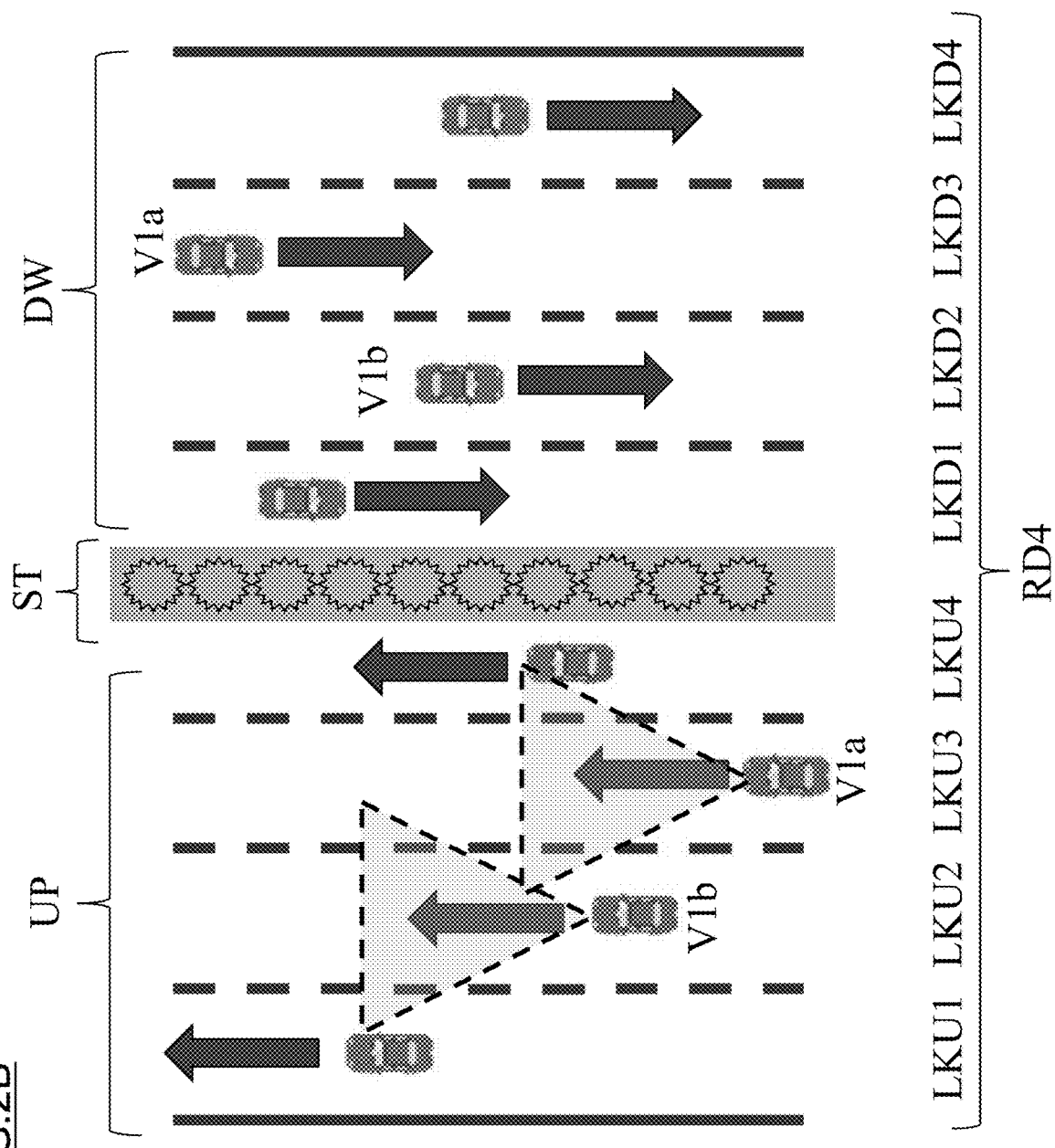
FIG. 2B is diagram for describing a road (non-specific road) that is not a specific road.

FIG. 2B illustrates an example in which common patterns of lane markers are included in some of two or more lanes belonging to a road.

The road illustrated in FIG. 2B is a road with four lanes on each side. The road in the inbound direction and the road in the outbound direction are separated by planting, and lanes LKU4 and LKD1 existing on both sides of the traffic strip of planting have a predetermined pattern of lane markers that is one and only for each of the inbound direction and the outbound direction. On the other hand, in a four-links group UP in the inbound direction, links LKU2 and LKU3 each have broken line lane markers on both sides, and the patterns of the right and left lane markers are common.

On such a road RD4, even when traveling directions (UP/DW) can be recognized, in a case in which the current position of a vehicle includes an error, the travel lane of the subject vehicle V1a, V1b may not be accurately specified. When the travel lane cannot be accurately specified, a lane is specified using the forms of lane markers. However, the links LKU2 and LKU3 of the four-links group UP in the inbound direction each have broken line lane markers on both sides, and the patterns (combinations) of the right and left lane markers are common, while also in four-links group DW in the outbound direction, links LKD2 and LKD3 each have broken line lane markers on both sides. The detection information regarding lane markers located ahead of the subject vehicle V1a and the detection information regarding lane markers located ahead of the subject vehicle V1b are common and, therefore, the travel lane and the target lane may not be specified for the subject vehicle V1a, V1b. Thus, it is inappropriate to define, as the specific road, a road in which two or more lanes having common traveling directions are included and each lane cannot be identified from the forms of lane markers.

Fortunately, however, when focusing on a predetermined characteristic lane marker (e.g., planting ST), lanes are defined by the planting ST, which is the predetermined characteristic lane marker, and the lane in the traveling direction UP is only the lane LKU4. When lanes are defined by a predetermined characteristic lane marker, one lane can be specified based on the characteristic lane marker. In the traveling direction DW, the lane having the characteristic lane marker (planting ST) among two or more lanes is only the lane LKD1. Thus, when the planting ST which is a characteristic lane marker and the traveling direction can be identified, the lane can be specified. Also when lanes are defined by a characteristic lane marker such as a guard rail or a curbstone, one lane can be specified. When the travel environment information 24 is generated by compositing the first information and the second information, it is highly likely that the determined travel lane and the target lane are accurately matched during the traveling on the specific road. When traveling on the specific road, the first information and the second information can be appropriately associated with each other, and it is therefore possible to generate the accurate travel environment information 24.

The control device 10 recognizes the forms/patterns of lane markers of lanes, such as by a pattern matching process, on the basis of the image captured by the camera 221. The control device 10 recognizes the forms/patterns of lane markers of lanes on the basis of the radar reception signal from the radar device 222. Information on the forms/patterns of lane markers of each lane is stored as the second information of the map information 21 and, therefore, a lane can be specified based on the forms/patterns of lane markers from among two or more lanes that are narrowed down by the first information such as positional information.

As described above, the control device 10 generates the travel environment information 24 by compositing the first information and the second information only in the timing/scene in which the subject vehicle is traveling on the specific road. The first information is information regarding the actual travel environment based on the detection information from a sensor of the subject vehicle. The second information is information regarding a road or a lane of the road based on the map information 21 which is preliminarily stored. Even when the map information 21 is high-definition map information, it is necessary to confirm the current and actual position on a road when the vehicle is controlled to autonomously travel. This is because there are obstacles, road closures, traffic restrictions, etc. in the actual travel route and it cannot always be expected that the map information is correct. The first information based on the detection information and the second information based on the map information 21 are partly common but partly different. The driving control apparatus 400 according to one or more embodiments of the present invention refers to the first information and the second information to control the traveling of the vehicle.

The first information is information that is sequentially detected as the vehicle travels, and the second information is the high-definition map information 21 which is preliminarily prepared. When the vehicle is controlled to autonomously travel, the high-definition map information 21 is required. Even when the map information 21 is created in detail, if the travel lane in which the vehicle actually travels cannot be accurately specified, the map information 21 for incorrect lanes will be read, and the execution of accurate autonomous traveling will be hindered. For example, when the target lane of the map information 21 corresponding to the travel lane is specified based on the positional information acquired via the GPS, if the accuracy of the positional information is low, an incorrect target lane may be specified. For example, the accuracy of the GPS positional information also varies depending on the signal reception environment, and even when the reception environment is good, an incorrect target lane may be specified due to the systematic error (mechanical error). In particular, when there are two or more lanes adjacent to a road, an accurate travel lane may not be specified even with an error of less than 1 m.

The control device 10 generates the travel environment information 24 which reflects the actual situation. The control device 10 generates the travel environment information 24 by compositing the first information regarding the travel environment including the travel lane based on the detection information from a sensor and the second information regarding lanes in the map information 21. The control device 10 controls the timing (situation) of performing the compositing process so that no mismatch occurs in the compositing process. The control device 10 selects the first information and the second information to be composited, on the basis of the information on the lanes.

The compositing process for the first information and the second information will be described hereinafter.

The difference between the first information and the second information is calculated, and the first information and the second information are composited based on the difference. Both the first information and the second information include information regarding the same lane, and the control device 10 composites the information items regarding the same lane. The source (information source) of the first information is the sensor detection information, and the source of the second information is the map information 21.

The compositing process includes a process of connecting the travel lane of the first information and the target lane of the second information (lane on the map information corresponding to the travel lane). The compositing process includes a process of changing the second information on the basis of the first information. In one or more embodiments of the present invention, the detection information which is actually detected is prioritized, and the second information is modified (changed) with reference to the first information based on the detection information. The modifying (changing) process includes a process of shifting (modifying or changing) the position of the target lane of the second information with reference to the position of the travel lane of the first information.

The compositing process for the first information and the second information allows the first information and the second information to be integrated with each other at an accurate position, and the travel environment information 24 can therefore be generated using the first information and the second information. Even when the data number/data amount of any one of the first information and the second information is insufficient (small), the travel environment information 24 can be supplemented and generated using the other information item. The travel environment information 24 includes at least the travel lane (route) in which the subject vehicle travels. The travel lane is a lane that reflects the actual environment around the subject vehicle.

The detection range of sensors including the detection device 220 is finite, and the first information is therefore information regarding a range (vicinity) of a predetermined distance from the subject vehicle. On the other hand, the second information is information based on the map information 21 and is information on a relatively wide range. In one or more embodiments of the present invention, the first information and the second information can be accurately composited (integrated) in the correct correspondence (including position matching), and it is therefore possible to create a driving plan from a short distance range to a long distance range for the subject vehicle. An appropriate travel route can be calculated by taking into account not only the situation in the short distance range but also the situation in the long distance range. The driving plan can be prevented from being changed many times, and the control for smoothly moving the vehicle can be executed.

The compositing process (integrating process) includes a changing (modifying) process for the second information. The map information 21 regarding the second information can be changed (modified) based on the first information, and it is therefore possible to generate the travel environment information 24 which reflects the actual environment around the subject vehicle. In one or more embodiments of the present invention, it is assumed that the first information regarding the actual travel environment based on the detection information from the subject vehicle is "true" information. According to this assumption, the changing process for the second information based on the first information can be expressed as the modifying (correcting) process which follows the true information.

The travel environment information 24 is generated when the subject vehicle is traveling on the specific road, and the first information and the second information can therefore be associated at the correct position. In other words, when traveling on the specific road, it is possible to reduce the risk that the first information (detection information) and the second information (map information 21) are incorrectly associated (matched). As a result, it is possible to prevent an erroneous lane (map information 21) that does not correspond to the travel lane from being read to calculate an incorrect travel route and create an incorrect driving plan. The driving plan based on an incorrect travel route is changed (corrected) after execution. When the driving plan is changed, unnecessary steering and acceleration/deceleration are performed, so the occupants are given uncomfortable feeling.

In one or more embodiments of the present invention, by changing (modifying) the second information on the basis of the first information based on the detection information, the travel control based on the travel environment information 24 which reflects the actually detected real environment can be executed. The travel control based on the travel environment information 24 in accordance with the actual environment is less likely to need the change or correction of the travel route, and it is therefore possible to suppress unnecessary steering and acceleration/deceleration. This can achieve reduction of the traveling time to the destination and reduction of the fuel consumption.

The control device 10 calculates the difference between the first information and the second information and composites the first information and the second information on the basis of the difference. The control device 10 composites the first information and the second information when the difference between the first information and the second information which are common in the target of information (lane/position) is a first threshold or more. When the difference is less than the first threshold, a determination is made that there is no need for compositing. Additionally or alternatively, the control device 10 composites the first information and the second information when the difference between the first information and the second information which are common in the target of information (lane/position) is less than a second threshold (>first threshold). This is because if the difference is not less than the second threshold, the first information and the second information may not be information regarding the same target (lane/position). The thresholds for evaluating the difference are appropriately defined in accordance with the accuracy of the first information and second information and the attribute of the road or lane (such as a highway or a narrow street).

The compositing process includes the connecting process for the first information and the second information. The source of the first information is the detection information from a sensor, and its range is therefore limited by the detection capability of the sensor. The source of the second information is the map information 21, and its range is therefore not limited. In the autonomous traveling, information on links to the destination is required. By connecting the first information and the second information, it is possible to obtain the travel environment information 24 in a range beyond the detection range of the sensor.

The compositing process includes the integrating process or superimposing process for the first information and the second information. The first information is information in the real space when the subject vehicle travels. The source (information source) of the first information is the detection information from a sensor, and it can therefore be expected that the first information reflects the actual situation more than the map information 21. The source of the second information is the map information 21 in which the measurement information pieces are matched based on the past measurement information and, therefore, the second information does not reflect the situation changes due to the attitude of the subject vehicle traveling and the temporary route change (such as due to the existence of an obstacle or construction). For smooth driving in the autonomous traveling, it is better to take into account the influence of the attitude of the subject vehicle, and the driving plan may have to be changed so as to move the subject vehicle along the changed route even for a temporary change. By integrating the first information and the second information, it is possible to execute the automated or autonomous driving control with consideration for both the map information 21 and the information on the real space detected by a sensor.

If the detection condition is ideal and the situation of the subject vehicle is exemplary (a model), the difference between the first information and the second information is small (e.g., less than the first threshold), and the automated or autonomous driving control is appropriately executed based on the first information and the second information. However, such a situation is rare, and the first information and the second information are therefore associated with each other to generate the travel environment information 24 in which the first information and the second information are composited. Although not particularly limited, when the difference between the first information and the second information is not less than the second threshold which is larger than the first threshold, the first information and the second information may be composited to generate the travel environment information 24. When the difference between the first information and the second information is not less than the second threshold, the compositing process, which includes any of the processes of connection, integration, and superposition, is performed to create new travel environment information 24. The created travel environment information 24 is stored in the storage device 20. The travel environment information 24 may be stored after being superimposed on the map information 21. The travel environment information 24 is used in the automated or autonomous driving control process executed by the driving control apparatus 400.

To perform high-level automated or autonomous driving in which a vehicle autonomously travels along a route without requiring human operation, it is necessary to accurately recognize the travel lane in the real space in which the vehicle currently travels, and accurately recognize the travel lane on the coordinates of the map information 21 which is used as the reference. The automated or autonomous driving control is based on the processes of recognition, determination, and operation. The accuracy of the recognition process affects the accuracy of the automated or autonomous driving control. In the recognition process, the accuracy is improved by accurately recognizing the actual state (accuracy of detection information) and accurately specifying the information (map information, link information) to be referred to.

The control device 10 refers to the map information 21 to specify the target lane corresponding to the travel lane on the basis of the first information. The control device 10 connects the travel lane and the target lane of the map information 21 corresponding to the travel lane on the basis of the difference in position between the first information and the second information. The control device 10 calculates the difference between the first information, which is the positional information of the travel lane, and the second information, which is the positional information of the target lane of the map information 21, and generates the travel environment information 24 by connecting the target lane, in which the positional difference from the travel lane is less than an identification threshold for identifying lanes, to the travel lane.

A scheme of the connecting process for the travel lane and the target lane will be described with reference to FIGS. 3A-3D.

FIG. 3A illustrates a travel lane L1 in which a subject vehicle V1 travels. The lane L1 is determined by the control device 10 on the basis of the detection information from the onboard apparatus 200 of the subject vehicle V1. The control device 10 recognizes that the travel lane L1 is a lane that is defined by a solid line lane marker LEL on the left side and a broken line lane marker LEM on the right side. This recognition process may be executed by the control device 410 of the driving control apparatus 400.

FIG. 3B illustrates a target lane LM in the map information 21 corresponding to the travel lane L1. FIG. 3B illustrates lane markers of the target lane superimposed on the lane markers of the travel lane L1 illustrated in the diagram of FIG. 3A. The control device 10 coordinate-converts the positional information of the travel lane L1 based on the detection information and the positional information of the target lane LM of the map information into common coordinates to calculate the difference. In FIG. 3B, the lane markers (second information) of the map information 21 are indicated by relatively thinner lines than the lane markers (first information) based on the detection information. The control device 10 refers to the map information 21 to recognize that the target lane LM of the subject vehicle V1 is a lane that is defined by a lane marker LML on the left side and a lane marker LMM on the right side.

Figure 3C:
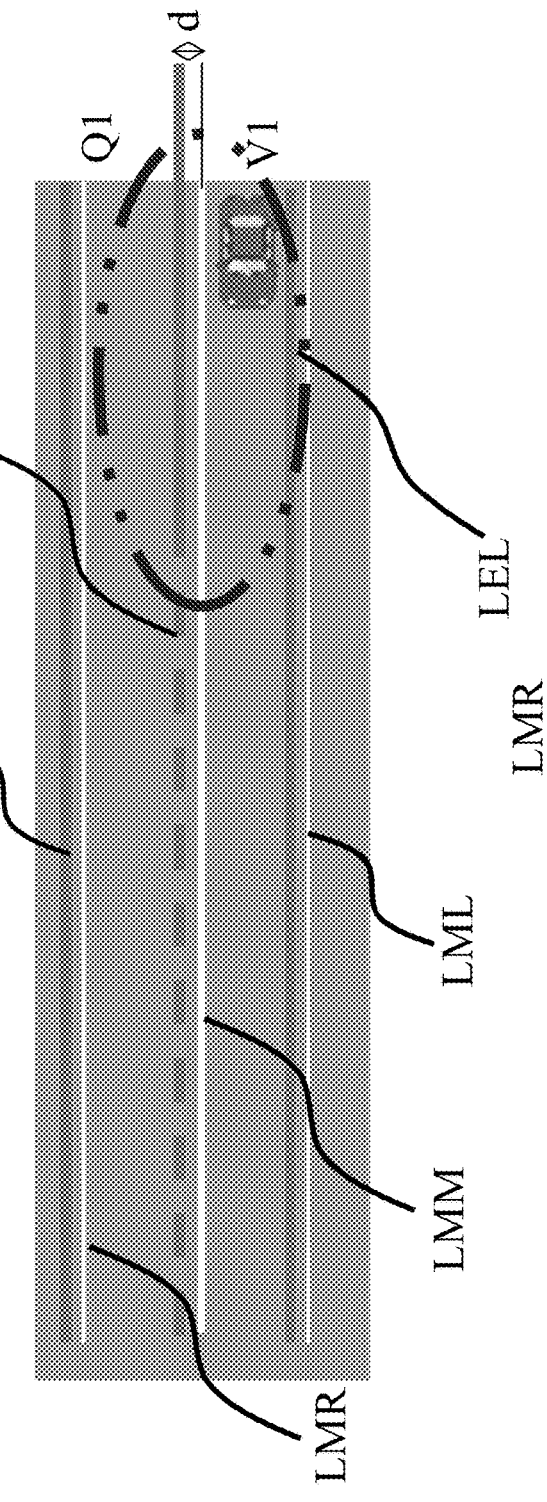
FIGS. 3C and 3D are a set of diagrams for describing an example of a connecting process for the travel lane and the target lane.
Figure 3D:
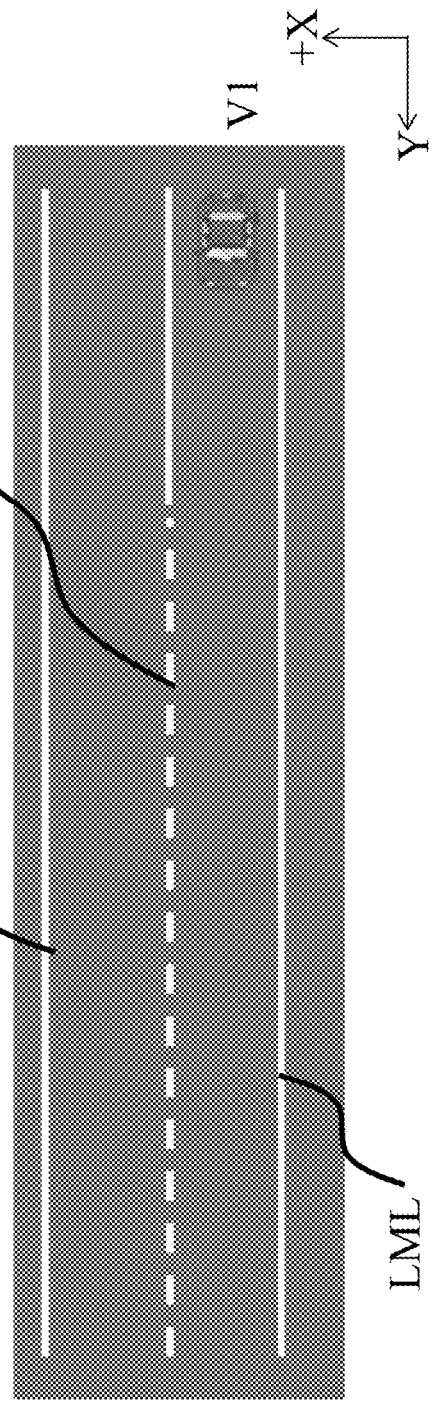

As illustrated in FIG. 3C, a distance d of misalignment occurs along the road width (Y direction in the figure) between the lane markers LEM and LEL of the travel lane L1 based on the detection information and the lane markers LMM and LML of the target lane LM of the map information 21. The travel lane L1 and the target lane LM are connected to composite the first information and the second information so that the distance d becomes zero. As illustrated in FIG. 3D, the control device 10 shifts the lane markers LMR, LMM, and LML of the target lane LM along the +X direction by a distance corresponding to the distance d. The control device 10 generates the travel environment information 24 so as to include the second information thus changed and stores the travel environment information 24 in the storage device 20.

FIGS. 4A-4C are a set of diagrams for describing misalignment between the first information and the second information at an intersection. The diagram in FIG. 4A represents a travel lane L1 that is recognized based on the detection information. To recognize the state of FIG. 4A, not only the detection information but also the map information 21 may be referred to. FIG. 4B is a diagram in which lane markers of a target road including a target lane LM corresponding to the travel lane L1 in the map information 21 are superimposed on lane markers of the travel lane L1 illustrated in FIG. 4A. As illustrated in FIG. 4B, a distance d of misalignment occurs along the road width (X direction in the figure) between lane markers LEM and LEL of the travel lane L1 based on the detection information and lane markers LMM and LML of the target lane LM of the map information 21. In this example, the misalignment in the lateral position of the travel lane (misalignment in the X direction) is focused, but the positional misalignment in the traveling direction (misalignment in the Y direction), such as the position of an intersection in the traveling direction, may also be focused. As illustrated in FIG. 4C, the control device 10 shifts the lane markers LMR, LMM, and LML of the target lane, which belong to the same road, along the +X direction by a distance corresponding to the distance d, and connects the travel lane and the target lane. The control device 10 composites the second information, the positions of which are changed, and the first information to generate the travel environment information 24. The generated travel environment information 24 is stored in the storage device 20.

As described above, the control device 10 executes the process of generating the travel environment information 24 only when the road including the travel lane in which the subject vehicle is currently traveling is the specific road. When the subject vehicle is traveling on the specific road, the position of the target lane of the second information is shifted, and the travel lane and the target lane are connected to composite the first information and the second information. The control device 10 specifies the target lane when traveling on the specific road, calculates the content (range, value, direction) to be changed, and generates the travel environment information 24 in which the target lane is connected to the travel lane. By controlling (limiting) the timing or scene of executing the process of generating the travel environment information 24, the second information is changed based on the first information whose source is the detection information, and the first information and the second information are composited; therefore, the travel environment information 24 can be generated with reference to the actual situation.

In a scheme of compositing the first information and the second information, the control device 10 composites the first information of a first area including the travel lane and the second information of a second area including the target lane so that the travel lane and the target lane included in the map information 21 corresponding to the travel lane are connected. Additionally or alternatively, the control device 10 may connect an area including the travel lane and an area including the target lane. On the basis of the difference in position between the first information and the second information, the control device 10 composites the first information and the second information so that the first area including the travel lane and the second area of the map information 21 including the target lane are connected.

When a determination is made that the target lane corresponding to the travel lane of the subject vehicle belongs to the specific road, that is, when a determination is made that the subject vehicle is traveling on the specific road, the matching condition which associates the travel lane and the target lane with each other is relaxed. Although not particularly limited, the following schemes are conceivable for relaxing the matching condition. (1) The threshold of distance for evaluating the correspondence relationship between the first information and the second information may be changed so that the first information and the second information are readily associated with each other. (2) The threshold in the recognition process for lane markers may be changed to a threshold that allows the lane markers to be readily detected. (3) The threshold for evaluating the accuracy of the positional information obtained from the GPS may be changed to a threshold that allows the positional information to be readily adopted. For example, when the threshold is the number of satellites that can receive signals among a plurality of GPS satellites, the number of satellites is set to a small value. For example, regarding the condition that "when the number of satellites that can receive signals is 5 or less, the positional information is not used," this condition is changed to a condition that "upon traveling on the specific road, when the number of satellites that can receive signals is 4 or less, the positional information is not used." (4) Additionally or alternatively, regarding the condition that "no matching process is performed in an environment in which the accuracy of detection information is liable to be low," for example, regarding the condition that "no matching process is performed in an environment such as night, rainy weather, or snow," the condition is changed to a condition that "when traveling on the specific road, the matching process is performed even in an environment such as night, rainy weather, or snow. When the subject vehicle is traveling on the specific road, the condition regarding generation of the travel environment information is relaxed. Through this operation, in a travel environment in which the subject vehicle is traveling on the specific road and lane matching errors are less likely to occur, the threshold regarding the lane matching can be relaxed to reduce the calculation load and allow the smooth processing to be executed.

In one or more embodiments of the present invention, a road having two or more lanes common in the forms of lane markers is defined as not the specific road. Through this definition, in a case in which the subject vehicle is traveling on the specific road, even when a matching error of the travel lane occurs due to a determination based only on the current position, the target lane can be specified by the forms of lane markers of each lane, and the relationship (including the positional relationship) between the first information and the second information (map information 21) can be accurately associated.

In particular, regarding roads each having two or more lanes common in the traveling direction, a road having two or more lanes common in the forms of lane markers of the lanes is not defined as the specific road. Through this definition, even in an environment in which a matching error of the travel lane is likely to occur, the target lane can be specified by the forms of lane markers of each lane, and appropriate travel environment information 24 can be generated.

The control device 10 calculates the difference between the first information and the second information and composites the first information and the second information on the basis of the calculated difference. The difference between the first information and the second information includes the difference in position between the travel lane in which the subject vehicle travels and the target lane. The first information is information on the actual space in which the subject vehicle travels, and the second information is information on a virtual (ideal) space defined in the map information 21. The difference between the first information and the second information is the misalignment of the state of the real space from the ideal state defined by the map information 21. The map information 21 is changed based on the difference to composite the first information and the second information and, therefore, the travel environment information 24 which reflects the state of the real space can be generated. Additionally or alternatively, the second information may be modified so that the second information has the same value as that of the first information, and the first information and the second information may be composited. The second information is modified so as to match the first information. That is, the second information is changed so as to be identical to the first information. This allows the travel environment information 24 to be acquired to put importance on the actual detection information.

The outline of a scheme of generating the travel environment information 24 will be described with reference to FIG. 5A to FIG. 5C. In these figures, to describe the scheme of compositing the first information and the second information, detailed lanes are not illustrated for the sake of simplicity. In these figures, the reduction ratio of the map information 21 and the like also give priority to the convenience of description.

Figure 5B:
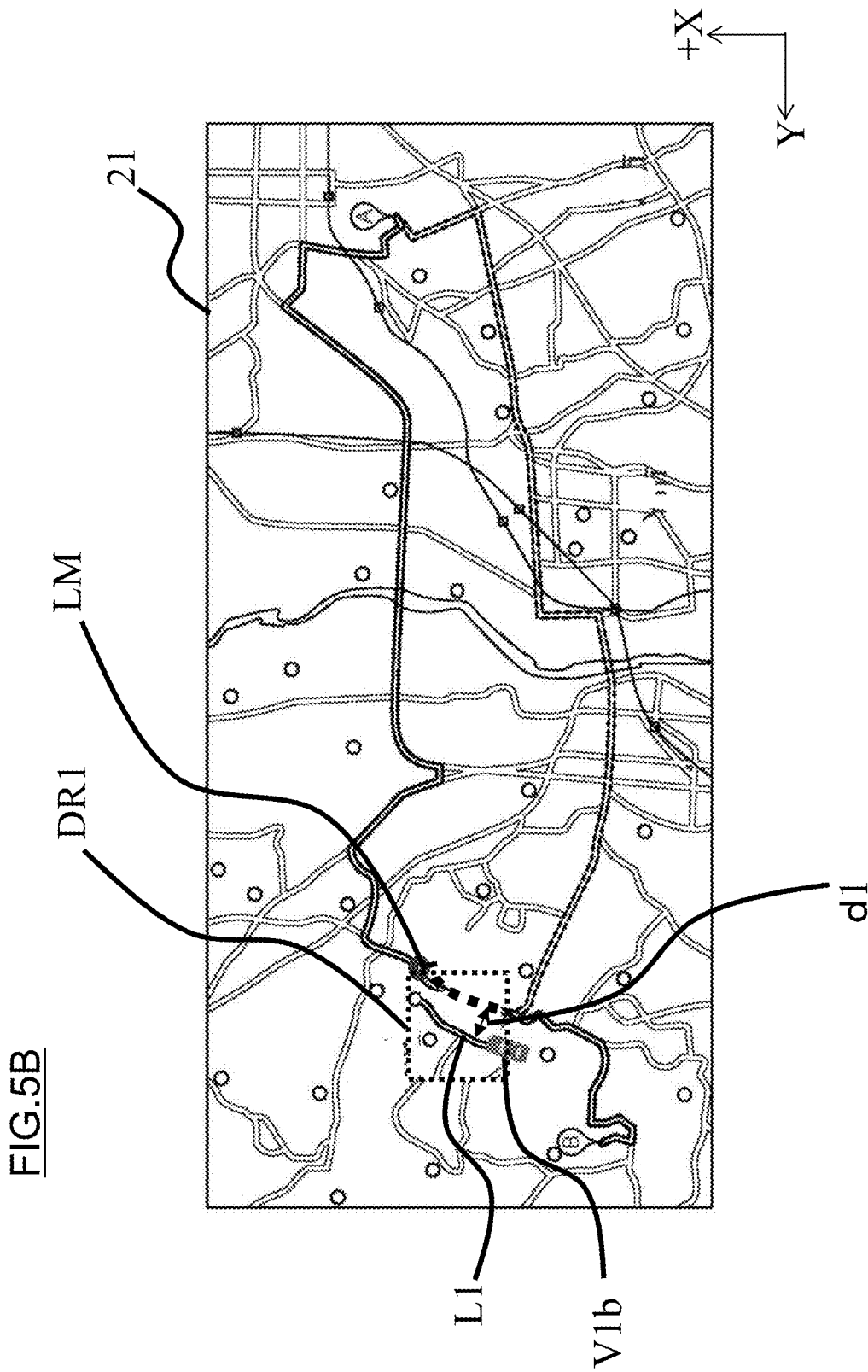
FIG. 5B is a second diagram for describing the compositing process.
Figure 5C:
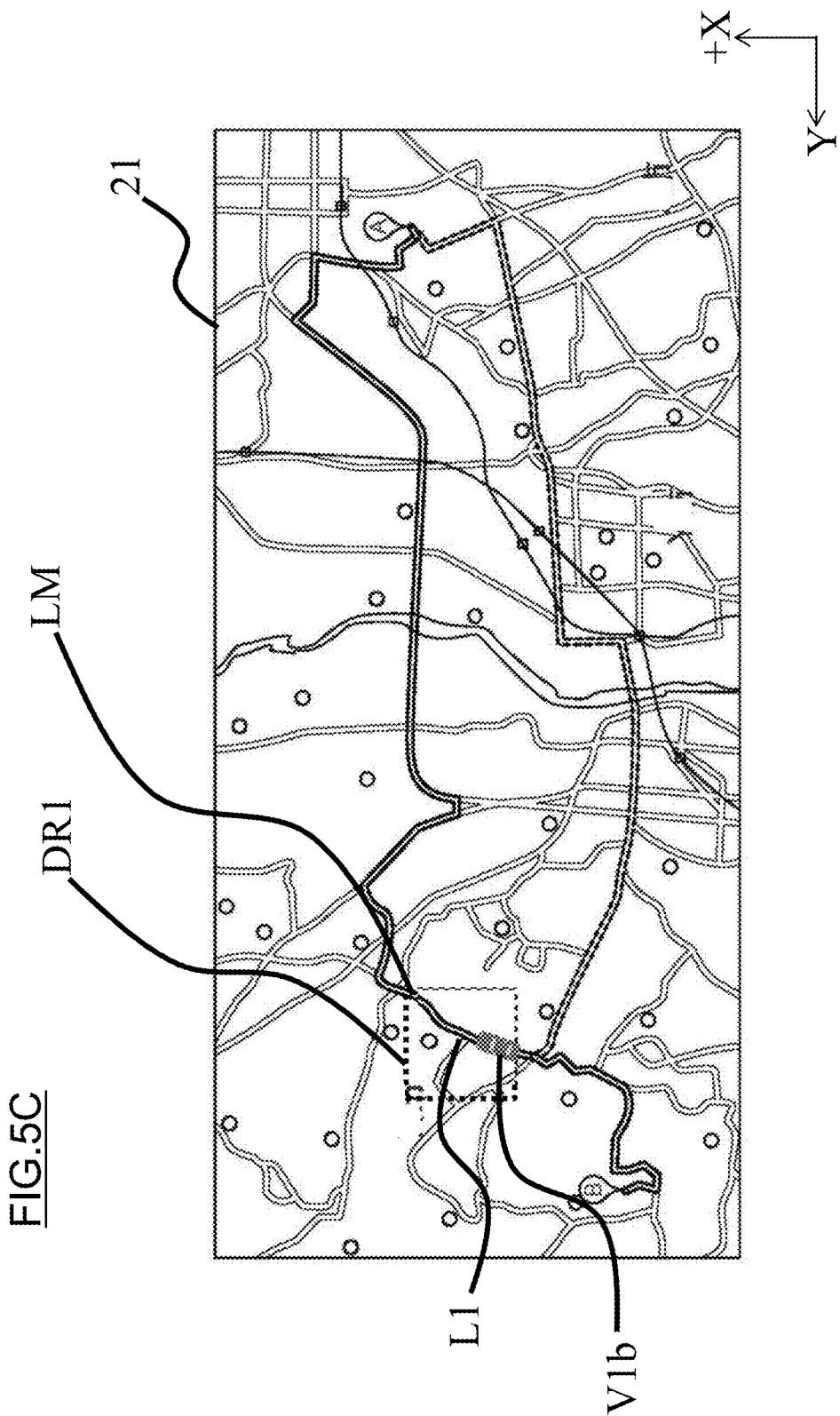
FIG. 5C is a third diagram for describing the compositing process.

FIG. 5A illustrates an example of the map information 21. FIG. 5B illustrates the map information 21 including the current position (V1b) of the subject vehicle V1b and a travel lane L1 based on the first information obtained from the detection information. The range in which the first information based on the detection information can be acquired is illustrated as an area DR1. The range of the area DR1 differs depending on the accuracy of the detection device 220 and the like. A target lane LM corresponding to the travel lane L1 is also illustrated. When a determination is made based on the positions, the travel lane L1 and the target lane LM are lanes that are relatively closest in distance or lanes between which the distance is less than a predetermined value. The figure illustrates a distance difference d1 between the travel lane L1 and the target lane LM. The control device 10 compares the first information based on the detection device 220 and/or the position detection device 231 equipped in the subject vehicle V1b with the second information regarding lanes stored in the map information 21 and calculates the distance difference d1.

Although not particularly limited, the control device 10 determines whether or not the travel lane L1 (or target lane LM) is a lane that belongs to the specific road, on the basis of the first information or the second information or on the basis of the first information and the second information. When a determination is made that the travel lane L1 (or target lane LM) belongs to the specific road, the control device 10 shifts either one or both of the travel lane L1 and the target lane LM in accordance with the distance difference d1 and connects these lanes. The control device 10 composites the first information and the second information on the basis of the difference d1 and the first information so that the target lane is connected to the travel lane. In one or more embodiments of the present invention, the first information based on the detection information is assumed to be the true information, and the second information is shifted (moved) based on the first information to align and composite the first information and the second information. As illustrated in FIG. 5C, the map information 21 of the second information is shifted in the coordinate XY directions by predetermined amounts on the basis of the previously calculated difference d1 so that the target lane LM is connected to the travel lane L1 in which the subject vehicle V1b travels. This process allows the travel environment information 24 to be generated in which the target lane LM of the map information 21 is connected to the travel lane L1. Not only the lane but also a predetermined area DR2 including the lane may be shifted.

The control device 10 changes the lane marker information of the target lane when generating the travel environment information 24. The lane marker information is included in the second information. As previously described, the lane marker information is information on the positions, forms, or attributes of lane markers. The second information includes identification information on the right side/left side of each lane and is represented by the positional information such as coordinate values of lane markers, information for identifying which forms of lines the lane markers have, such as solid lines, broken lines, and yellow lines, and/or information for identifying which forms of structures of traffic strips the lane markers have, such as curbstones, planting, guardrails, and road studs. When the travel lane belongs to the specific road, that is, when the subject vehicle is traveling on the specific road in which matching errors with the map information 21 are less likely to occur, the detection information in the travel lane is reflected in the second information.

In one or more embodiments of the present invention, when a determination is made that the travel road is the specific road, the lane marker information included in the second information of the target lane is changed based on the first information. The detection information regarding the lane markers which is actually acquired when the subject vehicle is traveling is reflected in the map information 21. Even in a case in which the lane markers are changed or other similar cases, the map information 21 can be updated in real time.

The process of generating the travel environment information 24 may be performed based on the first information which is acquired during the traveling in the travel lane in past times and accumulated as the travel history. When a determination is made that the travel lane belongs to the specific road, the control device 10 may composite the first information and the second information to generate the travel environment information 24 on the basis of the travel history, among the travel histories associated with the travel road, in which the number of times the subject vehicle travels is a predetermined number of times or more. The travel history includes the first information based on the detection information stored in association with the identifier of the travel lane. The travel environment information 24 is generated based on the representative value of a plurality of first information pieces. The representative value may be any one of the average value, deviation value, median value, and value that appears most often of the detection information. The detection information may be affected by the environment such as the weather (rainfall, snowfall) when traveling, the road surface of a road, the time of day (late afternoon sun, dusk, headlights of other vehicles), and location (lights, neon signs). When the number of times of traveling in a given travel lane is a predetermined number of times or more and the number of past records of traveling is large, the control device 10 uses the first information based on the detection information detected during the traveling in past times. This allows the travel environment information 24 to be generated while eliminating the influence of the environment. The history information including the number of times of traveling in the travel lane may be included in the detection information or may also be acquired from the navigation device 230.

The process of generating the travel environment information 24 may be performed based on the first information acquired when other vehicles travel in the travel lane. When a determination is made that the travel lane is a lane that belongs to the specific road, the control device 10 generates the travel environment information 24 on the basis of the first information of other vehicles accumulated in the server 300 for each lane. The control device 10 refers to the information accumulated in the server 300 via the communication device 30. The first information accumulated in the server 300 includes the first information based on the detection information acquired by the detection devices 220 equipped in a plurality of other vehicles, which first information is collected and accumulated in an external server via communication so that the first information can be referred to. The control device 10 refers to the accumulated first information for which the accumulated number of the first information from other vehicles is a predetermined number or more, and performs the compositing process with the second information on the basis of the representative value of the first information stored for each travel lane. When the number of times other vehicles have traveled is a predetermined number of times or more, that is, when the accumulated number of the stored first information is a predetermined number or more and the number of past records of traveling is large, the control device 10 can use the first information based on the detection information, which has been detected during the traveling of other vehicles, thereby to generate the travel environment information 24 while eliminating the influence of the environment. The history information including the number of times of traveling in the travel lane may be included in the detection information or may also be acquired from the navigation device 230. Preferably, the server 300 stores the accumulated information for each of the vehicle types of other vehicles.

The processing procedure executed by the driving control system 1 according to one or more embodiments of the present invention will be described with reference to the flowchart of FIG. 6. As for the content of the process in each step, the above description will be borrowed herein, and the process flow will be mainly described.

First, in step S1, the processor 11 acquires the detection information from the vehicle which is the control target. The detection information includes an image captured by the camera 221, measurement information from the radar device 222, positional information from the position detection device 223, or detection results based on these information items. The detection information includes output information from the vehicle sensor 260. The detection information includes information regarding the driving of the vehicle, such as the traveling direction, vehicle speed, acceleration, braking amount, steering amount, steering speed, and steering acceleration, vehicle spec information, and vehicle performance information. The detection information includes the position of the travel lane in which the vehicle travels, the positions of lane markers of the travel lane, the forms of lane markers, the presence or absence of an object around the subject vehicle, the attribute of the object (stationary object or moving object), the position of the object, the speed/acceleration of the object, and the traveling direction of the object. The detection information can be acquired from the onboard apparatus 200 which includes the detection device 220, the navigation device 230, and the vehicle sensor 260.

In step S2, the processor 11 calculates the current position of the subject vehicle, which is traveling, on the basis of the detection information. The current position is determined based on the detection information including the GPS reception signals and the odometer information.

In step S3, the processor 11 acquires the first information regarding the surrounding travel environment including the travel lane in which the subject vehicle travels, on the basis of the detection information.

In step S4, the processor 11 specifies the travel lane in which the subject vehicle travels, on the basis of the change over time in the current position of the subject vehicle. The travel lane may be specified by plotting the current position or may also be specified based on the current position and information extracted from the image captured by the camera 221. For example, the travel road may be specified based on text information such as road guidance.

In step S5, the processor 11 refers to the map information 21 stored in the storage device 20 to acquire the second information regarding lanes of a road. The second information to be acquired is preferably, but is not limited to, information regarding the travel lane.

In step S6, the processor 11 determines whether or not the travel road to which the travel lane belongs is a specific road. The control device 10 stores the definition of the specific road. The processor 11 determines whether or not the travel road to which the travel lane belongs is a specific road, on the basis of the acquired first information. The processor 11 determines whether or not the travel road to which the travel lane belongs is a specific road, on the basis of the acquired second information. The processor 11 refers to the map information 21 to extract the target lane corresponding to the travel lane. The target lane is defined in the map information 21. The processor 11 determines whether or not the target lane belongs to the specific road, on the basis of the information on lanes associated with the target lane. The target lane and the travel lane are the same lane and, therefore, when the target lane belongs to the specific road, the travel lane also belongs to the specific road.

When the travel road to which the travel lane belongs is not a specific road, the process of generating the travel environment information 24 is not executed. This is because when traveling on a road other than the specific road, there is a possibility that the first information regarding the travel lane and the second information regarding the target lane corresponding to the travel lane cannot be accurately matched.

In step S7, the processor 11 generates the travel environment information 24. The processor 11 composites the first information and the second information to generate the travel environment information 24.

The process of generating the travel environment information 24 will be described with reference to the flowchart of FIG. 7.

In step S101, the processor 11 acquires the first information. This process corresponds to step S3 of FIG. 6.

In step S102, the processor 11 acquires the second information regarding the target lane corresponding to the travel lane.

In step S103, the processor 11 converts the lane markers of the travel lane into common coordinates. In step S104, the processor 11 matches the travel lane and the target lane at the common coordinates.

In step S105, the processor 11 confirms that the matching process between the travel lane and the target lane has been completed. When the distance between the travel lane and the target lane is less than a predetermined value, a determination is made that the matching has been completed. The matching between the travel lane and the target lane may be performed by comparison of the lane positional information, comparison of the lane identification numbers, comparison of the identification numbers or positions of the links or nodes included in the lanes, or other appropriate comparison. The point at which the positions are compared may be the position of a link defined in the second information of the target lane or the position of a node defining the link. The number of points at which the positions are compared may be one or may also be two or more. The processes of S101 and the subsequent steps are repeated until the matching process between the travel lane and the target lane is completed.

In step S106, the processor 11 compares the first information with the second information and calculates the difference. Specifically, the distance between the travel lane and the target lane is calculated as the difference between the first information and the second information.

In step S107, the processor 11 determines whether or not the difference in position between the travel lane and the target lane in the common coordinates is a predetermined value or more. The predetermined value is a value defined in accordance with the amount of misalignment between the first information and the second information (map information 21). When the difference of a value larger than the predetermined value is detected, the second information (map information 21) is changed in the compositing process. On the other hand, when the difference is less than the predetermined value, the process returns to step S101 to be performed. On the contrary, when the difference is less than the predetermined value, the travel environment information may not be updated. When the difference is the predetermined value or more, a determination is made that the compositing process is necessary, while when the difference is less than the predetermined value, a determination is made that the compositing process is unnecessary.

In another scheme of evaluating the difference, when a large difference of the predetermined value or more is detected, the degree of reliability of the difference is low, so the process may return to step S101 to be performed without performing the compositing process. On the other hand, when the difference is less than the predetermined value, the second information (map information 21) may be changed in the compositing process on the assumption that the difference may be an amount of misalignment between the first information and the second information.

Additionally or alternatively, in a scheme of evaluating the difference, when the difference is within a predetermined value range, the processes of step S108 and subsequent steps may be performed. When the amount of misalignment between the first information and the second information tends to fall within the predetermined value range as a result of analysis of the accumulated data, the predetermined value range may be defined based on the variance value range of the amount of misalignment.

In step S108, the processor 11 determines whether or not the travel road to which the travel lane belongs is a specific road. The above-described one or more definitions can be adopted as the definition of the specific road. The processor 11 limits the timing/state in which the first information and the second information are composited to generate the travel environment information 24. The processor 11 generates the travel environment information 24 only when the subject vehicle is traveling on the specific road. The processor 11 determines whether or not the travel road to which the travel lane belongs is a specific road. When the subject vehicle is traveling on the specific road, the following process of generating the travel environment information 24 is executed.

In step S109, the processor 11 changes (modifies) the position of the target lane of the second information in accordance with the difference.

In step S110, the processor 11 connects the end of the travel lane and the end of the target lane and composites the first information and the second information to obtain the travel environment information 24.

In step S111, the processor 11 writes the travel environment information 24 in the storage device 20. The travel environment information 24 may be superimposed on the map information 21.

The process returns to the corresponding storage process of step S8 of FIG. 6. In step S8, the processor 11 stores new travel environment information 24 each time the travel environment information 24 is generated, and updates the travel environment information 24 which has been previously generated and stored. In this operation, the calculated difference may be stored so as to be associated with the lane identification information. In the next process, only the difference can be read to generate the travel environment information 24.

The process transitions to the driving control process. The driving control processor 411 of the driving control apparatus 400 reads the latest travel environment information 24. In step S9, the driving control processor 411 acquires the detected object information. In step S10, the driving control processor 411 calculates a route for avoiding objects. In step S11, the driving control processor 411 determines the driving action at each point on the route. Examples of the driving action include "progressing," "steering," and "stopping." Examples of the driving action include those relating to the speed, acceleration, steering angle, deceleration, and rate of deceleration (deceleration acceleration).

In step S12, the driving control processor 411 creates a driving plan in which each point and the driving action are associated with each other over time. In step S13, the driving control processor 411 creates a driving control instruction for causing the vehicle to execute the driving plan. In step S14, the driving control processor 411 transmits the driving control instruction to the vehicle controller 280. In step S15, the driving control processor 411 causes the vehicle to execute the driving plan via the vehicle controller 280. The vehicle controller 280 executes the driving control on the basis of the created driving plan. In step S16, the driving control processor 411 executes the driving control until the destination is reached.

The driving of the vehicle is controlled based on the generated travel environment information 24, and it is therefore possible to perform the travel control in accordance with the actual environment acquired from the detection information. The travel environment information 24 is generated by the compositing process in which the travel lane and the target lane of the map information 21 are accurately associated with each other, so the control content calculated based on the travel environment information 24 is accurate and is not changed. As a result, smooth traveling is achieved without causing the vehicle to perform unnecessary steering and acceleration/deceleration.

Specifically, the driving control processor 411 calculates a target control value on the basis of an actual X-coordinate value (X-axis is the vehicle width direction) of the subject vehicle V1, a target X-coordinate value corresponding to the current position, and a feedback gain. The target control value relates to a steering angle, a steering angular speed, and other parameters necessary for moving the vehicle V1 on the target X-coordinate value. The driving control processor 411 outputs the target control value to the onboard apparatus 200. The vehicle V1 travels on the target route which is defined by a target lateral position. The driving control processor 411 calculates a target Y-coordinate value (Y-axis is the traveling direction of the vehicle) along the route. The driving control processor 411 compares the current Y-coordinate value and the vehicle speed and acceleration at the current position of the vehicle V1 with the target Y-coordinate value corresponding to the current Y-coordinate value and the vehicle speed and acceleration at the target Y-coordinate value and calculates a feedback gain for the Y-coordinate value on the basis of the comparison results. The driving control processor 411 calculates a target control value for the Y-coordinate value on the basis of the vehicle speed, acceleration, and deceleration corresponding to the target Y-coordinate value and the feedback gain for the Y-coordinate value.

Here, the target control value in the Y-axis direction refers to a control value for each of the operation of drive mechanism (which includes the operation of an internal-combustion engine in the case of an engine car and the operation of an electric motor in the case of an electric car and may further include the torque distribution for an internal-combustion engine and an electric motor in the case of a hybrid car) and the braking operation to achieve the acceleration, deceleration, and vehicle speed corresponding to the target Y-coordinate value. For example, in an engine car, the control function serves to calculate a target amount of intake air (target opening degree of the throttle valve) and a target amount of fuel injection on the basis of values of the current and target acceleration, deceleration, and vehicle speed and send them to the drive device 290. Alternatively, the control function may serve to calculate the acceleration, deceleration, and vehicle speed and send them to the vehicle controller 280, which may calculate a control value for each of the operation of drive mechanism (which includes the operation of an internal-combustion engine in the case of an engine car and the operation of an electric motor in the case of an electric car and may further include the torque distribution for an internal-combustion engine and an electric motor in the case of a hybrid car) and the braking operation to achieve these acceleration, deceleration, and vehicle speed.

The driving control processor 411 outputs the calculated target control value in the Y-axis direction to the onboard apparatus 200. The vehicle controller 280 executes the steering control and drive control to operate the subject vehicle to travel on the target route which is defined by the target X-coordinate value and the target Y-coordinate value. The process is repeated every time the target Y-coordinate value is acquired, and the control value for each of the acquired target X-coordinate values is output to the onboard apparatus 200. The vehicle controller 280 executes the driving control instruction in accordance with the command from the driving control processor 411 until the vehicle arrives at the destination.

The travel environment information generation apparatus 100 according to one or more embodiments of the present invention is configured and operates as above, and the method of generating travel environment information which is used in the travel environment information generation apparatus 100 is executed as above; therefore, the following effects can be obtained.

(1) In the method of generating travel environment information according to one or more embodiments of the present invention, when a determination is made that the travel road to which the travel lane belongs is a predetermined specific road on the basis of the first information, the first information and the second information are composited to generate the travel environment information 24. The travel environment information 24 is generated only when the travel road to which the travel lane of the subject vehicle belongs is the specific road. The process of generating the travel environment information 24 is executed under the environment which is defined by a predetermined condition. By controlling (limiting) the timing of executing the process of generating the travel environment information 24, the information on the real space detected by a sensor and the preliminarily stored map information 21 can be appropriately composited to generate the travel environment information 24 which reflects the situation of the real space.

The travel environment information 24 is generated when the subject vehicle is traveling on the specific road, and the first information and the second information can therefore be associated with each other at the correct position. In other words, when traveling on the specific road, the risk that the first information (detection information) and the second information (map information 21) are incorrectly associated (matched) is low. As a result, it is possible to prevent an erroneous lane (map information 21) that does not correspond to the travel lane from being read to calculate an incorrect travel route and create an incorrect driving plan. The driving plan based on an incorrect travel route is changed (corrected) after execution. When the driving plan is changed, unnecessary steering and acceleration/deceleration are performed, so the occupants may be given uncomfortable feeling. In one or more embodiments of the present invention, by changing (modifying) the second information on the basis of the first information based on the detection information, the travel control based on the travel environment information 24 which reflects the actually detected real environment can be executed. The travel control based on the travel environment information 24 in accordance with the actual environment is less likely to need the change or correction of the travel route, and it is therefore possible to suppress unnecessary steering and acceleration/deceleration.

This can achieve reduction of the traveling time to the destination and reduction of the fuel consumption.

(2) In the method of generating travel environment information according to one or more embodiments of the present invention, a determination is made based on the first information and the second information as to whether or not the travel road is the specific road, and therefore whether or not the travel road is the specific road can be accurately determined based on the actually measured information and the preliminarily prepared information.

(3) In the method of generating travel environment information according to one or more embodiments of the present invention, the specific road is defined as a road in which the number of lanes is a predetermined number. The larger the number of lanes belonging to one road, the more difficult it is to specify a unique lane. By defining the specific road on the basis of the number of lanes belonging to one road, a state in which the unique lane is readily specified is defined. The number of lanes may be a limited numerical value or may also be a numerical value that defines a range. Definition may be made with a range such as a range of a predetermined number or less. In a scene of traveling on the specific road having a predetermined number of lanes, the first information and the second information can be accurately associated with each other. The process of generating the travel environment information 24 is executed under an environment in which the number of lanes is a predetermined number. By controlling (limiting) the timing of executing the process of generating the travel environment information 24, the information on the real space detected by a sensor and the preliminarily stored map information 21 can be appropriately composited to generate the travel environment information 24 which reflects the situation of the real space.

(4) In the method of generating travel environment information according to one or more embodiments of the present invention, the specific road is defined as a road in which the number of lanes in the inbound direction is one and the number of lanes in the outbound direction is one. The traveling direction in a lane can be identified in accordance with the first information such as a captured image. When the number of lanes belonging to a road in the same traveling direction is one, the first information and the second information can be accurately associated with each other. The process of generating the travel environment information 24 is executed under an environment in which the number of lanes in the same direction is one. By controlling (limiting) the timing of executing the process of generating the travel environment information 24, the information on the real space detected by a sensor and the preliminarily stored map information 21 can be appropriately composited to generate the travel environment information 24 which reflects the situation of the real space.

(5) In the method of generating travel environment information according to one or more embodiments of the present invention, the specific road is defined as a road in which the number of lanes in the inbound direction or the outbound direction is one. The traveling direction in a lane can be identified in accordance with the first information such as a captured image. When the number of lanes belonging to a road in the same traveling direction is one, the first information and the second information can be accurately associated with each other. The process of generating the travel environment information 24 is executed under an environment in which the number of lanes in the same direction is one. By controlling (limiting) the timing of executing the process of generating the travel environment information 24, the information on the real space detected by a sensor and the preliminarily stored map information 21 can be appropriately composited to generate the travel environment information 24 which reflects the situation of the real space.

(6) In the method of generating travel environment information according to one or more embodiments of the present invention, the specific road is defined as a road in which the number of lanes belonging to the road changes from two or more to one on the traveling direction side. Even in a case in which the travel road includes a plurality of lanes, when a determination is made that the number of lanes changes to one on the traveling direction side, it can be expected that the situation/scene/timing will be suitable for execution of the process of generating the travel environment information 24 in the near future. The control device 10 generates the travel environment information 24 when the vehicle is expected to travel on the specific road suitable for generating the travel environment information 24, and it can therefore be expected that the travel environment information 24 is generated with a small difference from the actual environment.

(7) In the method of generating travel environment information according to one or more embodiments of the present invention, the specific road is defined as a road in which it is possible to specify which lane of the lanes of the travel road the vehicle is traveling in, on the basis of the patterns of lane markers that define two or more lanes.

Each lane marker is a boundary between two lanes on the right and left. The features of lane markers are stored for each lane. Even in a case in which the number of lanes of the travel road is two or more, when the features of lane markers of each lane are different, the unique lane can be specified with a high degree of certainty. By defining the specific road as a road in which the features of all the lane markers of two or more lanes belonging to one road are different, the timing of traveling or the traveling position in which the unique lane is readily specified can be defined. For example, a road in which the features of lane markers of two or more lanes are all different can be defined as the specific road.

The control device 10 generates the travel environment information 24 when it is expected that the vehicle travels on the specific road suitable for generating the travel environment information 24, and it can therefore be expected that the travel environment information 24 is generated with a small difference from the actual environment.

(8) In the method of generating travel environment information according to one or more embodiments of the present invention, the specific road is defined as a road in which the number of lanes in the inbound direction or the outbound direction is two or more and it is possible to specify which lane of the lanes of the travel road the vehicle is traveling in. For example, the specific road is a road in which the two or more lanes in the inbound direction or the outbound direction of the road have different lane markers. The control device 10 generates the travel environment information 24 when it is expected that the vehicle travels on the specific road suitable for generating the travel environment information 24, and it can therefore be expected that the travel environment information 24 is generated with a small difference from the actual environment.

(9) In the method of generating travel environment information according to one or more embodiments of the present invention, the specific road is defined as a road in which the number of lanes in the inbound direction or the number of lanes in the outbound direction of the travel road is two or more and the lanes in the inbound direction or the lanes in the outbound direction are defined by predetermined characteristic lane markers. In a road with two or more lanes on each side, the lane marker on the right side of a road including two or more lanes may be different from the lane marker on the left side. This is a case in which, for example, among the lane markers of two or more lanes, the lane marker on the most oncoming road side is planting and the lane marker on the outermost side (on the opposite side to the oncoming road) is a curbstone. In this case, the lane having the lane marker of planting can be specified as a unique lane on the most oncoming road side, and the lane having the lane marker of a curbstone can be specified as a unique lane on the outermost side.

When the lane marker of a certain lane is a "predetermined lane marker" on a road with two or more lanes on each side, the position of the lane can be specified, and as a result, the unique target lane can be extracted. The target lane is selected based on the determination as to whether or not the travel lane (target lane) includes a "predetermined lane marker," and the unique target lane can therefore be specified by the features of the lane marker even when traveling on a road with two or more oncoming lanes. When the lane has a "predetermined lane marker," a determination is made that the environment is suitable for the process of generating the travel environment information 24, and the travel environment information 24 can be generated when traveling in such a travel lane (specific road); therefore, highly reliable travel environment information 24 can be generated.

(10) In the method of generating travel environment information according to one or more embodiments of the present invention, the difference between the first information and the second information is calculated, and the first information and the second information are composited based on the calculated difference. The first information represents the actual space in which the subject vehicle travels, and the second information represents a virtual (ideal) space defined in the map information 21. The difference between the first information and the second information is the misalignment of the state of the real space from the ideal state defined by the map information 21. The map information 21 is changed based on the difference and, therefore, the travel environment information 24 which reflects the state of the real space can be generated.

(11) In the method of generating travel environment information according to one or more embodiments of the present invention, the second information is changed based on the difference d1 so that the travel lane and the target lane are connected. The travel lane detected in the real space in which the subject vehicle exists and the virtual target lane defined in the map information 21 can be connected. The travel environment information 24 can be generated which reflects the first information in which the real space is reflected.

(12) In the method of generating travel environment information according to one or more embodiments of the present invention, the second information regarding an area including the target lane is changed based on the difference d1 and the first information so that the target lane is connected to the travel lane. The second information regarding the area including the target lane includes information on the position, range, shape, radius of curvature of the target lane, the position and range of the area including the target lane, or information on other lanes. The area of the first information including the travel lane detected in the real space in which the subject vehicle exists, and the area including the virtual target lane defined in the map information 21, can be connected at the correct position. The travel environment information 24 can be generated which reflects the first information regarding the travel lane determined in the real space.

(13) In the method of generating travel environment information according to one or more embodiments of the present invention, when a determination is made that the travel road is the specific road, the condition for associating the travel lane and the target lane with each other is relaxed. In a travel environment in which the subject vehicle is traveling on the specific road and lane matching errors are less likely to occur, the threshold regarding the lane matching can be relaxed to reduce the calculation load and allow the smooth processing to be executed.

(14) In the method of generating travel environment information according to one or more embodiments of the present invention, when the travel road is the specific road, the lane marker information associated with the target lane of the second information is changed based on the first information. The map information 21 can reflect the detection information regarding the lane markers that is actually acquired when the subject vehicle travels. The map information 21 can be updated in real time, such as when the lane markers are changed.

(15) In the method of generating travel environment information according to one or more embodiments of the present invention, when the number of times of traveling is a predetermined number of times or more and the number of past records of traveling is large, the control device 10 uses the first information based on the detection information detected during the traveling in past times and can thereby change the second information while eliminating the influence of the environment.

(16) In the method of generating travel environment information according to one or more embodiments of the present invention, the control device 10 refers to the accumulated first information for which the accumulated number of the first information from other vehicles is a predetermined number or more, and changes the second information on the basis of the representative value of the first information stored for each travel lane. When the number of times other vehicles have traveled is a predetermined number of times or more, that is, when the accumulated number of the stored first information is a predetermined number or more and the number of past records of traveling is large, the control device 10 can use the first information based on the detection information, which has been detected during the traveling of other vehicles, thereby to change the second information while eliminating the influence of the environment.

(17) In the driving control method according to one or more embodiments of the present invention, the driving of the vehicle is controlled based on the generated travel environment information 24, and the traveling can therefore be achieved in accordance with the determination based on the detection information under the actual environment. According to the method of generating travel environment information in one or more embodiments of the present invention, the first information and the second information are composited in a timely manner on the basis of the first information based on the actual situation around the subject vehicle and, therefore, the travel environment information which reflects the actual situation can be generated while referring to the map information 21. In the automated or autonomous driving control, the driving/behavior of the subject vehicle is autonomously controlled based on the real-time detection information from the onboard detection device 220 and vehicle sensor 260. By changing/modifying the map information 21 in accordance with the detection information and compositing the first information and the second information, it is possible to appropriately specify the route and achieve the smooth autonomous traveling. The control content does not change due to the difference between the travel lane and the target lane of the map information 21, and the smooth traveling can be performed.

(18) In the driving control method according to one or more embodiments of the present invention, the travel route including the connection point between the travel lane and the target lane is calculated based on the travel environment information in which the first information and the second information are composited in a timely manner so that the travel lane and the target lane of the map information corresponding to the travel lane are connected. The subject vehicle is controlled to travel on the basis of the travel route in which the travel lane of the subject vehicle based on the first information and the target lane based on the second information are connected at the connection point and, therefore, the driving control can be executed based on the travel environment information which reflects the actual situation while referring to the map information 21. Moreover, the same action and effect as those in the preceding paragraph can be obtained.

(19) In the driving control method according to one or more embodiments of the present invention, the first information and the second information regarding the lane existing at a position farther than surroundings of the subject vehicle according to the travel environment obtained by the first information are composited. That is, in this driving control method, the first information around the subject vehicle and the second information at a location (area on the destination side) farther than the first information are composited so that the travel lane and the target lane are connected. This allows the travel route to be calculated based on the travel environment information in which the first information around the subject vehicle and the second information on the far side as the destination of the subject vehicle are composited so that the travel lane and the target lane are connected. The travel route is a lane (route) in which the travel lane based on the first information and the target lane based on the second information are connected in series. By controlling the subject vehicle to travel along the travel route connected from the actual travel lane based on the detection information of a sensor to the target lane leading to the destination, the driving control can be executed with consideration for the travel environment on the far side while referring to the map information 21 and adapting to the actual travel environment. Moreover, the same action and effect as those in the one or more preceding paragraphs can be obtained.

(20) The travel environment information generation apparatus 100 according to one or more embodiments of the present invention exhibits the same action and effect as those of the above-described method of generating travel environment information.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1 Driving control system
100 Travel environment information generation apparatus
10 Control device
11 Processor
20 Storage device
21 Map information
22 Lane information
23 Traffic regulation information
24 Travel environment information
30 Communication device
200 Onboard apparatus
210 Communication device
220 Detection device, Sensor
221 Camera
222 Radar device
230 Navigation device
231 Position detection device, Sensor
232 Storage device
240 Storage device
241 Map information
242 Lane information
243 Traffic regulation information
250 Output device
251 Display
252 Speaker
260 Vehicle sensor, Sensor
261 Steering angle sensor
262 Vehicle speed sensor
263 Attitude sensor
270 Lane-keeping device
280 Vehicle controller
290 Drive device
295 Steering device
300 Server
310 Control device
311 Processor
320 Storage device
321 Map information
322 Lane information
323 Traffic regulation information
330 Communication device
400 Driving control apparatus
410 Control device
411 Driving control processor
420 Storage device
430 Communication device

The invention claimed is:

1. A method of generating travel environment information, the method being executed by a processor, the method comprising:

acquiring first information regarding a surrounding travel environment including a travel lane in which a subject vehicle travels, the first information being based on detection information from a sensor equipped in the subject vehicle;

referring to map information stored in a storage device to acquire second information regarding lanes of a road;

extracting features of a travel road to which the travel lane in which the subject vehicle travels belongs on a basis of the first information;

determining whether the travel road to which the travel lane belongs is a predetermined specific road on a basis of the extracted features of the travel road;

based on a result of determining whether the travel road to which the travel lane on which the vehicle is traveling is the predetermined specific road, controlling timing of compositing the first information and the second information to generate the travel environment information; and controlling movement of the subject vehicle based on the travel environment information.

2. The method of generating travel environment information according to claim 1, comprising:
determining whether or not the travel road is the predetermined specific road on a basis of the first information and the second information.

3. The method of generating travel environment information according to claim 1, comprising:
acquiring a number of lanes belonging to the travel road; and
in response to the number of lanes being a predetermined number, determining that the travel road is the predetermined specific road.

4. The method of generating travel environment information according to claim 1, comprising:
acquiring a number of lanes belonging to the travel road;
determining whether or not the number of lanes in an inbound direction and the number of lanes in an outbound direction are both one; and
in response to a determination is being made that the number of lanes in the inbound direction of the travel road and the number of lanes in the outbound direction of the travel road are both one, determining that the travel road is the predetermined specific road.

5. The method of generating travel environment information according to claim 1, comprising:
acquiring a number of lanes belonging to the travel road;
determining whether or not the number of lanes in an inbound direction or an outbound direction is one; and
in response to a determination being made that the number of lanes in the inbound direction or outbound direction of the travel road is one, determining that the travel road is the predetermined specific road.

6. The method of generating travel environment information according to claim 1, comprising:
acquiring a change in a number of lanes on a traveling direction side of the travel lane; and
in response to a determination being made that the number of lanes changes from two or more to one, determining that the travel road is the predetermined specific road.

7. The method of generating travel environment information according to claim 1, comprising:
acquiring a number of lanes belonging to the travel road; and
in response to a determination being made that the number of lanes of the travel road is two or more and the travel road can be specified as to which lane of the lanes of the travel road the subject vehicle is traveling in, on a basis of patterns of lane markers that define the lanes belonging to the travel road, determining that the travel road is the predetermined specific road.

8. The method of generating travel environment information according to claim 1, comprising:
acquiring a number of lanes of the travel road; and
in response to a determination being made that the number of lanes in an inbound direction or outbound direction of the travel road is two or more and it is possible to specify which lane of the lanes of the travel road the subject vehicle is traveling in, on a basis of patterns of lane markers that define the lanes in the inbound direction or the lanes in the outbound direction, determining that the travel road is the predetermined specific road.

9. The method of generating travel environment information according to claim 1, comprising:
acquiring a number of lanes of the travel road; and
in response to a determination being made that the number of lanes in an inbound direction or the number of lanes in an outbound direction of the travel road is two or more and the lanes in the inbound direction or the lanes in the outbound direction are defined by predetermined characteristic lane markers, determining that the travel road is the predetermined specific road.

10. The method of generating travel environment information according to claim 1, comprising:
calculating a difference between the first information and the second information and compositing the first information and the second information on a basis of the difference.

11. The method of generating travel environment information according to claim 10, comprising:
compositing the first information and the second information on the basis of the difference in position between the first information and the second information so that the travel lane and a target lane of the map information corresponding to the travel lane are connected.

12. The method of generating travel environment information according to claim 10, comprising:
compositing the first information and the second information on the basis of the difference in position between the first information and the second information so that a first area including the travel lane and a second area including a target lane of the map information corresponding to the travel lane are connected.

13. The method of generating travel environment information according to claim 11, comprising:
in response to the determination being made that the travel lane is the predetermined specific road, relaxing a condition for associating the travel lane and the target lane with each other.

14. The method of generating travel environment information according to claim 11, comprising:
in response to the determination being made that the travel lane is the predetermined specific road, changing lane marker information on the basis of the first information, the lane marker information being included in the second information and associated with the target lane of the map information corresponding to the travel lane.

15. The method of generating travel environment information according to claim 1, comprising:
accumulating travel histories including the first information and traveling positions detected in past times; and
in response to the determination being made that the travel lane is the predetermined specific road, compositing the first information and the second information on a basis of the travel history, among the travel histories associated with the travel road, in which a number of times the subject vehicle travels is a predetermined number of times or more.

16. The method of generating travel environment information according to claim 1, comprising:
accumulating travel histories including the first information and traveling positions transmitted to a server via a communication line; and
in response to the determination being made that the travel lane is the predetermined specific road, referring to a reference travel history, among the travel histories associated with the travel road, in which a number of times the subject vehicle travels is a predetermined number of times or more to composite the first information of the reference travel history and the second information.

17. A driving control method comprising:
referring to the travel environment information obtained by the method of generating travel environment information according to claim 1;
calculating a travel route of the subject vehicle on a basis of the travel environment information; and
causing the subject vehicle to travel along the travel route.

18. The driving control method according to claim 17, comprising:
compositing the first information and the second information to generate the travel environment information so that the travel lane and a target lane of the map information corresponding to the travel lane are connected; and
calculating, on the basis of the travel environment information, the travel route including a connection point between the travel lane and the target lane of the map information corresponding to the travel lane.

19. The driving control method according to claim 17, comprising:
acquiring the first information and the second information regarding the travel lane existing at a position farther than surroundings of the subject vehicle according to the travel environment obtained by the first information;
compositing the first information and the second information to generate the travel environment information so that the travel lane and a target lane of the map information corresponding to the travel lane are connected; and
calculating the travel route on the basis of the travel environment information.

20. A travel environment information generation apparatus comprising:
a communication device configured to acquire detection information from a sensor equipped in a subject vehicle; and
a processor configured to execute a process of generating travel environment information,
the processor executing:
a process of acquiring the detection information via the communication device;
a process of acquiring first information regarding a surrounding travel environment including a travel lane in which the subject vehicle travels, the first information being based on the detection information from the sensor;
a process of referring to map information stored in a storage device to acquire second information regarding lanes of a road;
a process of extracting features of a travel road to which the travel lane in which the subject vehicle travels belongs, on a basis of the first information;
a process of determining whether the travel road to which the travel lane belongs is a predetermined specific road on a basis of the extract features of the travel road;
a process of controlling timing of compositing the first information and the second information to generate the travel environment information based on a result of determining whether the travel road to which the travel lane belongs is the predetermined specific road; and
a process of controlling movement of the subject vehicle based on the travel environment information.

* * * * *